United States Patent
Hamada

(10) Patent No.: US 9,300,913 B2
(45) Date of Patent: Mar. 29, 2016

(54) COMMUNICATION SYSTEM, COMMUNICATION MANAGEMENT APPARATUS, AND RECORDING MEDIUM

(71) Applicant: Yuuta Hamada, Tokyo (JP)

(72) Inventor: Yuuta Hamada, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 6 days.

(21) Appl. No.: 14/200,366

(22) Filed: Mar. 7, 2014

(65) Prior Publication Data

US 2014/0267566 A1 Sep. 18, 2014

(30) Foreign Application Priority Data

Mar. 14, 2013 (JP) ................................. 2013-052500

(51) Int. Cl.
 H04N 7/14 (2006.01)
 H04N 7/15 (2006.01)
 H04L 29/06 (2006.01)
 H04L 12/18 (2006.01)

(52) U.S. Cl.
 CPC .............. *H04N 7/15* (2013.01); *H04L 12/1831* (2013.01); *H04L 65/4038* (2013.01); *H04L 12/1822* (2013.01)

(58) Field of Classification Search
 CPC ........................ H04L 65/1093; H04L 12/1827
 USPC ....................................... 348/14.07; 709/204
 See application file for complete search history.

(56) References Cited

U.S. PATENT DOCUMENTS

| | | | | |
|---|---|---|---|---|
| 8,180,029 B2* | 5/2012 | Katis et al. | | 379/93.01 |
| 8,311,938 B2* | 11/2012 | Shivers et al. | | 705/39 |
| 8,537,196 B2* | 9/2013 | Hegde et al. | | 348/14.09 |
| 9,063,952 B2* | 6/2015 | Moraleda | | G06F 17/30247 |
| 2001/0047349 A1* | 11/2001 | Easty et al. | | 707/3 |
| 2012/0221715 A1 | 8/2012 | Hamada | | |
| 2013/0254279 A1* | 9/2013 | Bentley et al. | | 709/204 |
| 2014/0029474 A1* | 1/2014 | Bhagavatula et al. | | 370/260 |
| 2014/0136612 A1* | 5/2014 | Redfern et al. | | 709/204 |
| 2015/0006461 A1* | 1/2015 | Miyata | | G06N 5/04 706/50 |

FOREIGN PATENT DOCUMENTS

| | | |
|---|---|---|
| JP | 2011-191881 | 9/2011 |
| JP | 2011-197914 | 10/2011 |
| JP | 2012-195925 | 10/2012 |

* cited by examiner

*Primary Examiner* — Creighton Smith
(74) *Attorney, Agent, or Firm* — Oblon, McClelland, Maier & Neustadt, L.L.P.

(57) ABSTRACT

A communication system managing a communication conference which uses a plurality of communication terminals includes an acquisition unit acquiring electronic information related to the communication conference from a registration terminal which registers the electronic information; and a management unit registering communication identification information in association with the electronic information, the communication identification information identifying the communication that the communication terminals attend during communications between one communication terminal, which is related to terminal identification information acquired from the registration terminal, and another communication terminal of the communication terminals.

12 Claims, 30 Drawing Sheets

FIG.5

| TERMINAL ID | STATE | CONFERENCE ID | CONFERENCE SESSION ID |
|---|---|---|---|
| 110001 | IN CONFERENCE | conf001 | cse001 |
| 110002 | IN CONFERENCE | conf001 | cse002 |
| 110003 | WAITING | — | — |
| ... | ... | ... | ... |

| COMMUNI-CATION TYPE | COMMUNI-CATION SOURCE TERMINAL ID | COMMUNI-CATION DESTI-NATION TERMINAL ID | SESSION ID | CONFERENCE ID | CONFERENCE SESSION ID | COMMUNICATION DATE AND TIME | RELATED INFOR-MATION |
|---|---|---|---|---|---|---|---|
| online | 110001 | – | se001 | – | – | 2010-09-01 09:30:00 | – |
| online | 110002 | – | se002 | – | – | 2010-09-01 09:30:00 | – |
| online | 110003 | – | se003 | – | – | 2010-09-01 09:30:00 | – |
| invite | 110001 | 110002 | – | conf001 | – | 2010-09-01 09:59:50 | – |
| accept | 110002 | 110001 | – | conf001 | – | 2010-09-01 09:59:59 | – |
| start | 110001 | – | – | conf001 | – | 2010-09-01 10:00:00 | – |
| join | 110001 | – | – | conf001 | cse001 | 2010-09-01 10:00:00 | – |
| join | 110002 | – | – | conf001 | cse002 | 2010-09-01 10:00:00 | – |
| call | 110003 | 110001 | – | conf001 | – | 2010-09-01 10:09:50 | – |
| accept | 110001 | 110003 | – | conf001 | – | 2010-09-01 10:09:59 | – |
| join | 110003 | – | – | conf001 | cse003 | 2010-09-01 10:10:00 | – |
| text | 110001 | – | – | conf001 | cse001 | 2010-09-01 10:12:00 | xxxxx |
| file | 110002 | – | – | conf001 | cse002 | 2010-09-01 10:20:00 | \<filedata\> |
| leave | 110002 | – | – | conf001 | cse002 | 2010-09-01 10:40:00 | – |
| offline | 110003 | – | se003 | conf001 | cse003 | 2010-09-01 11:30:25 | – |
| leave | 110001 | – | – | conf001 | cse001 | 2010-09-01 11:30:25 | – |
| end | 110001 | – | – | conf001 | – | 2010-09-01 11:30:25 | – |
| offline | 110001 | – | se001 | – | – | 2010-09-01 11:35:00 | – |
| offline | 110002 | – | se002 | – | – | 2010-09-01 11:40:00 | – |
| ... | ... | ... | ... | ... | ... | ... | ... |
| online | 110005 | – | se005 | – | – | 2010-09-12 14:20:00 | – |
| online | 110006 | – | se006 | – | – | 2010-09-12 14:21:00 | – |
| invite | 110005 | 110006 | – | conf002 | – | 2010-09-12 14:29:50 | – |
| accept | 110006 | 110005 | – | conf002 | – | 2010-09-12 14:29:55 | – |
| start | 110005 | – | – | conf002 | – | 2010-09-12 14:30:00 | – |
| join | 110005 | – | – | conf002 | cse005 | 2010-09-12 14:30:00 | – |
| ... | ... | ... | ... | ... | ... | ... | ... |

FIG.7

| LOG DATA |
|---|
| [{"COMMUNICATION TYPE":"online", "COMMUNICATION SOURCE TERMINAL ID":"110001", "SESSION ID":"se001", "COMMUNICATION DATE AND TIME":"2010-09-01 09:30:00"}] |
| [{"COMMUNICATION TYPE":"online", "COMMUNICATION SOURCE TERMINAL ID":"110002", "SESSION ID":"se002", "COMMUNICATION DATE AND TIME":"2010-09-01 09:30:00"}] |
| [{"COMMUNICATION TYPE":"online", "COMMUNICATION SOURCE TERMINAL ID":"110003", "SESSION ID":"se003", "COMMUNICATION DATE AND TIME":"2010-09-01 09:30:00"}] |
| [{"COMMUNICATION TYPE":"invite", "COMMUNICATION SOURCE TERMINAL ID":"110001", "COMMUNICATION DESTINATION TERMINAL ID":"110002", "CONFERENCE ID":"conf001", "COMMUNICATION DATE AND TIME":"2010-09-01 09:59:50"}] |
| [{"COMMUNICATION TYPE":"accept", "COMMUNICATION SOURCE TERMINAL ID":"110002", "COMMUNICATION DESTINATION TERMINAL ID":"110001", "CONFERENCE ID":"conf001", "COMMUNICATION DATE AND TIME":"2010-09-01 09:59:59"}] |
| [{"COMMUNICATION TYPE":"text", "COMMUNICATION SOURCE TERMINAL ID":"110001", "COMMUNICATION DESTINATION TERMINAL ID":"", "CONFERENCE ID":"conf001", "SESSION ID":"cse001", "COMMUNICATION DATE AND TIME":"2010-09-01 10:12:00", "RELATED INFORMATION":"xxxxx"}] |
| ... |

FIG.8

| RECORD ID | TERMINAL ID | CONFER-ENCE ID | CONFERENCE SESSION ID | JOIN DATE AND TIME | LEAVE DATE AND TIME | ATTENDANCE TIME PERIOD | LEAVE STATE |
|---|---|---|---|---|---|---|---|
| 001 | 110001 | conf001 | cse001 | 2010-09-01 10:10:00 | 2010-09-01 11:10:25 | 01:00:25 | LEAVE |
| 002 | 110002 | conf001 | cse002 | 2010-09-01 10:00:00 | 2010-09-01 10:40:00 | 00:40:00 | LEAVE |
| 003 | 110003 | conf001 | cse003 | 2010-09-01 10:10:00 | 2010-09-01 11:30:25 | 01:20:25 | FORCED TERMINATION |
| 004 | 110005 | conf002 | cse005 | 2010-09-12 14:30:00 | — | — | IN CONFERENCE |
| ... | ... | ... | ... | ... | ... | ... | ... |

| CONFERENCE ID | HOST TERMINAL ID | START DATE AND TIME | END DATE AND TIME | CONFERENCE TIME PERIOD |
|---|---|---|---|---|
| conf001 | 110001 | 2010-09-01 10:00:00 | 2010-09-01 11:30:25 | 01:30:25 |
| conf002 | 110005 | 2010-09-12 14:30:00 | — | — |
| ... | ... | ... | ... | ... |

| CONFERENCE ID | RELATED INFORMATION ID | TERMINAL ID | TRANSMISSION DATE AND TIME | TYPE | DATA |
|---|---|---|---|---|---|
| conf001 | 001 | 110001 | 2010-09-01 10:12:00 | text | xxxxx |
| conf001 | 002 | 110002 | 2010-09-01 10:20:00 | file | \<filename\>:\<filedata\> |
| ... | ... | ... | ... | ... | ... |

FIG.13

| COMMUNI-CATION TYPE | COMMUNICATION SOURCE TERMINAL ID | SESSION ID | CONFERENCE ID | CONFERENCE SESSION ID | COMMUNICATION DATE AND TIME | RELATED INFORMATION |
|---|---|---|---|---|---|---|
| text | 110001 | - | conf001 | cse001 | 2010-09-01 10:12:00 | xxxxx |

CONFERENCE RECORD — 1501

TERMINAL ID: 110001　　　　　　　　　　　　　　　　HELP　LOG OUT

MAIN MENU > CONFERENCE RECORD

CONFERENCE ATTENDANCE RECORD (SEPTEMBER 2010)

▼　SEPTEMBER 2010 ▶　▲ — 1502

| CONFER-ENCE ID | START DATE AND TIME | END DATE AND TIME | JOIN DATE AND TIME | LEAVE DATE AND TIME | ATTENDANCE TIME PERIOD | LEAVE STATE | RELATED INFORMATION |
|---|---|---|---|---|---|---|---|
| conf001 | 2010-09-01 10:00:00 | 2010-09-01 11:30:25 | 2010-09-01 10:10:00 | 2010-09-01 11:10:25 | 01:00:25 | LEAVE | REFER |
| conf004 | 2010-09-02 16:00:00 | 2010-09-02 17:00:00 | 2010-09-02 15:10:00 | 2010-09-02 15:30:40 | 00:20:40 | LEAVE | REFER |
| conf005 | 2010-09-05 13:00:00 | 2010-09-05 14:00:00 | 2010-09-05 13:00:00 | 2010-09-05 14:00:00 | 01:00:00 | FORCED TERMINATION | REFER |
| conf006 | 2010-09-12 18:00:00 | 2010-09-12 20:31:02 | 2010-09-12 18:01:10 | 2010-09-12 20:30:45 | 02:29:35 | LEAVE | REFER |

RELATED INFORMATION

TERMINAL ID: 110001                                    HELP  LOG OUT

MAIN MENU > CONFERENCE ATTENDANCE RECORD (SEPTEMBER 2010) > RELATED INFORMATION

RELATED INFORMATION: ⌐1701   ⌐1702                    ⌐1703                    ⌐1704

| CONFERENCE ID | HOST TERMINAL ID | START DATE AND TIME | END DATE AND TIME | CONFERENCE TIME PERIOD |
|---|---|---|---|---|
| conf001 | 110001 | 2010-09-01 10:00:00 | 2010-09-01 11:30:25 | 01:30:25 |

RELATED INFORMATION:   ⌐1705

10:12 (110001) xxxxxxxxxxxxxxxxxxxxxxxxxxxxxxxxxxxxxxx
10:20 (110002) ATTACHED FILE : xxxxxx.doc
10:34 (110001) yyyyyyyyyyyyyyyyyyyyyyyyyyyyyyyyyyyyyyy
11:02 (110003) zzzzzzzzzzzzzzzzzzzzzzzzzzzzzzzzzzzzzzz
zzzzzzzzzzzzzzzzzzzzzzzzzzzzzzzzzzzzzzz

BACK

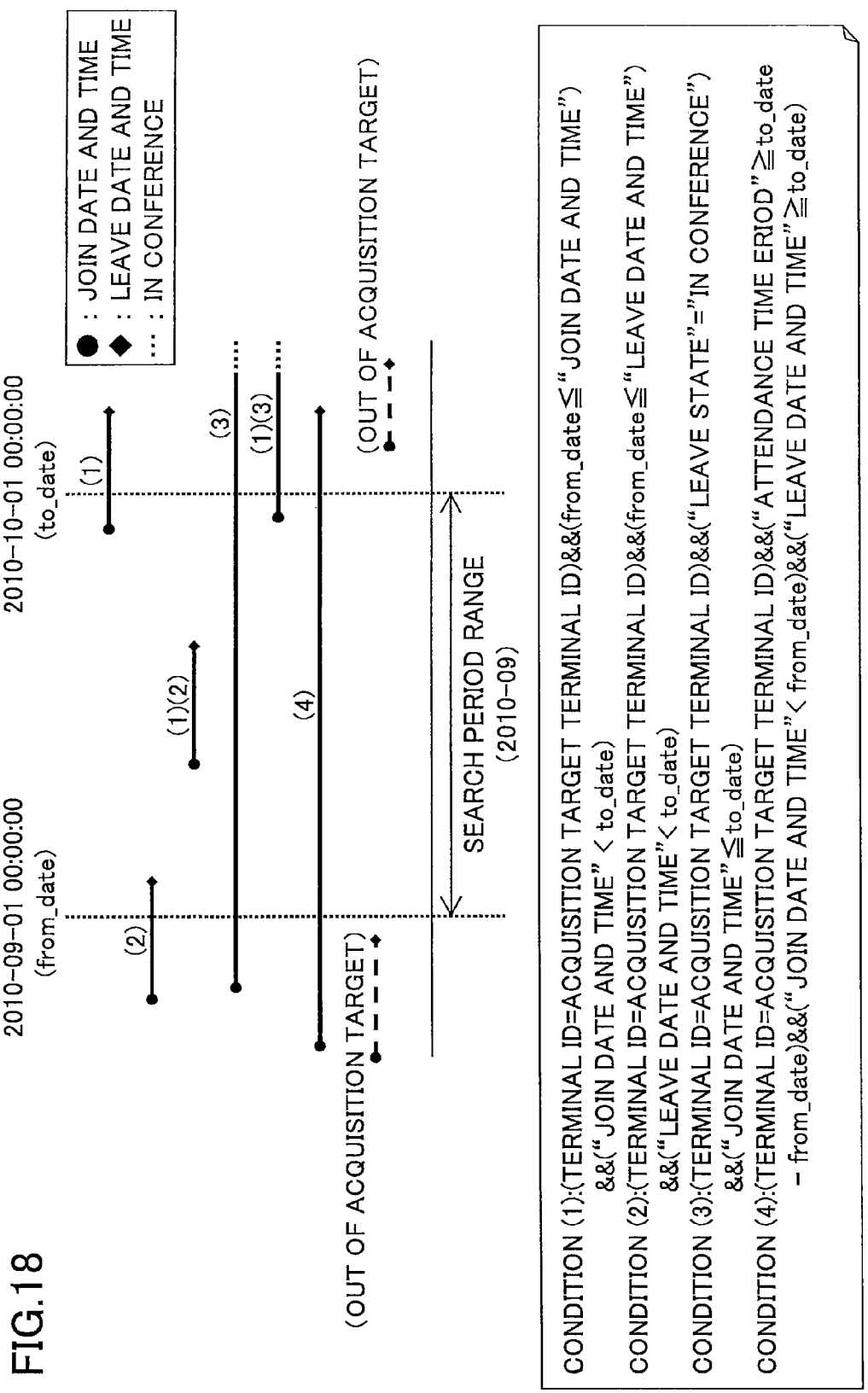

FIG.23

| CONFERENCE ID | HOST TERMINAL ID | PRIVATE CODE |
|---|---|---|
| conf001 | 110001 | xxxxxxx |
| conf002 | 110005 | yyyyyyy |
| ... | ... | ... |

| CONFERENCE ID | HOST TERMINAL ID | START DATE AND TIME | END DATE AND TIME | CONFERENCE TIME PERIOD | PRIVATE CODE 503c-2 |
|---|---|---|---|---|---|
| conf001 | 110001 | 2010-09-01 10:00:00 | 2010-09-01 11:30:25 | 01:30:25 | xxxxxx |
| conf002 | 110005 | 2010-09-12 14:30:00 | – | – | yyyyyy |
| ... | ... | ... | ... | ... | ... |

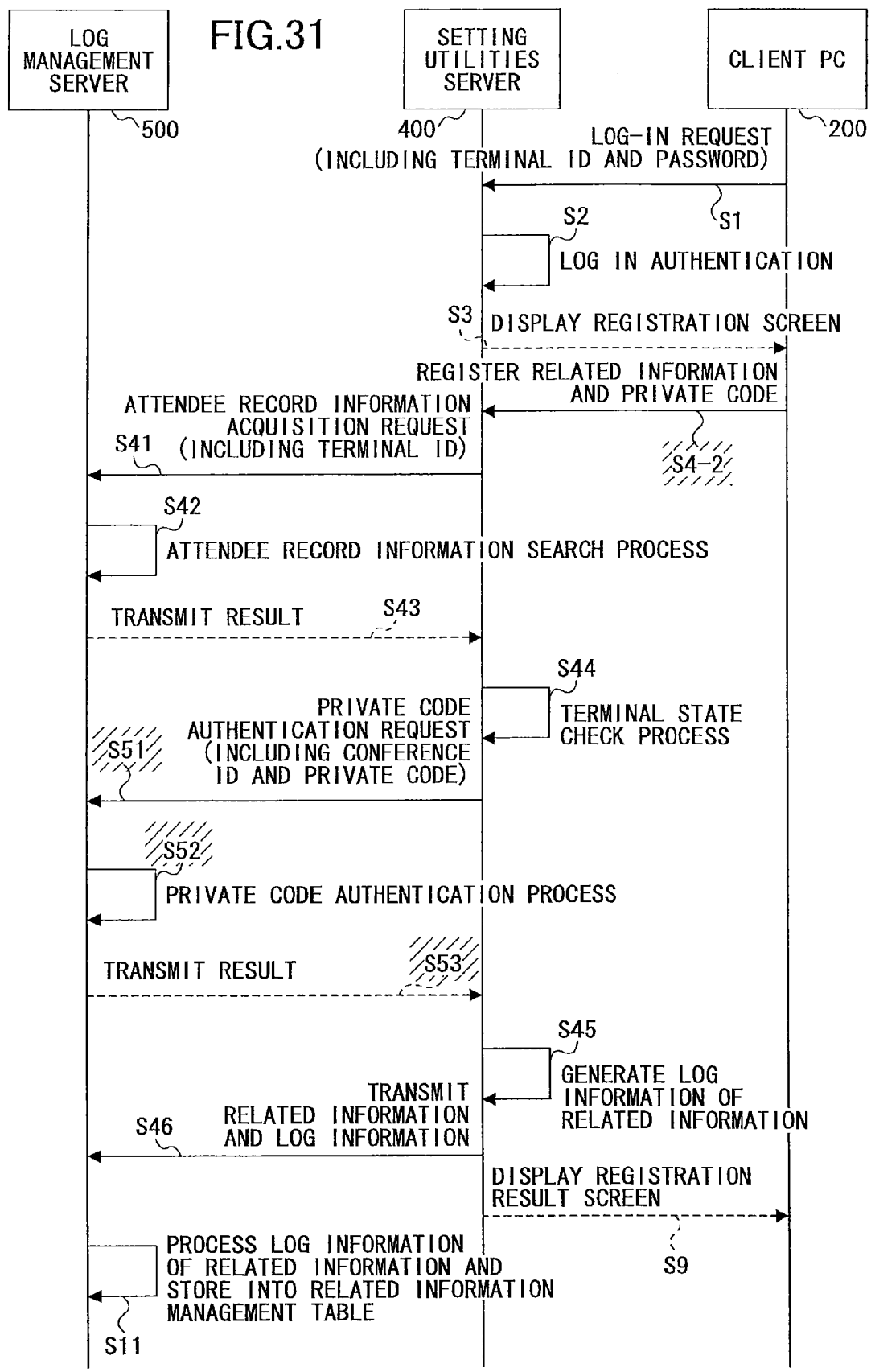

COMMUNICATION SYSTEM, COMMUNICATION MANAGEMENT APPARATUS, AND RECORDING MEDIUM

CROSS-REFERENCE TO RELATED APPLICATIONS

The present application is based on and claims the benefit of priority under 35 U.S.C. §119 of Japanese Patent Application No. 2013-052500 filed on Mar. 14, 2013, the entire contents of which are hereby incorporated herein by reference.

BACKGROUND OF THE INVENTION

1. Field of the Invention

The present invention relates to a communication system, a communication management apparatus, and a program (recording medium).

2. Description of the Related Art

Recently, a communication management system (e.g., a conference system) in which video data including image data and voice data are transmitted among a plurality of communication terminals via a communication network such as the Internet has become more and more popular. Further, with the enhancement of broadband environment, it has become possible to transmit and receive high-quality image data and voice data. As a result, it become easier to know a status of an opposite person in a remote conference, so that the attendees of remote conference may feel as if they attend an actual conference held in front of the attendees.

Further, there has been known a technique in such a communication management system that related information, which relates to the communications among a plurality of communication terminals, and supplementary information are stored in the form of a text memo or an attached file, so that the stored related information is managed to be reviewed later.

For example, Japanese Patent Publication No. 2011-197914 discloses an invention (communication system) that receives agenda memo information from a conference participation terminal during the conference, generates conference related information based on the agenda memo information in association with time information, and presents the generated conference related information.

SUMMARY OF THE INVENTION

According to an aspect of the present invention, a communication system managing a communication (conference) which uses a plurality of communication terminals includes an acquisition unit acquiring electronic information related to the communication (conference) from a registration terminal which registers the electronic information; and a management unit registering communication identification information in association with the electronic information, the communication identification information identifying the communication (conference) that the communication terminals attend during communications between one communication terminal, which is related to terminal identification information acquired from the registration terminal, and another communication terminal of the communication terminals.

BRIEF DESCRIPTION OF THE DRAWINGS

Other objects, features, and advantages of the present invention will become more apparent from the following description when read in conjunction with the accompanying drawings, in which:

FIG. 5 is an example of a communication terminal state table;

FIG. 6 illustrates an example of log information;

FIG. 7 illustrates an example of the log information in a JSON format;

FIG. 8 illustrates an example attendee record table;

FIG. 9 illustrates an example of a scheduled conference management table;

FIG. 10 illustrates a related information management table;

FIG. 13 is an example of log information of the related information;

FIG. 16 is an example of a list screen of the conference attendance record;

FIG. 17 is an example of a browsing screen of the related information;

FIG. 18 illustrates search conditions;

FIG. 23 is an example of a conference information table;

FIG. 26 illustrates an example of a scheduled conference management table;

FIG. 31 is a sequence diagram of the registration process of registering the related information.

DETAILED DESCRIPTION OF THE PREFERRED EMBODIMENTS

In related technologies such as the communication system according to Japanese Patent Publication No. 2011-197914, the stored agenda memo information is associated with only the date and time information. Therefore, when the stored agenda memo information is to be browsed later, the agenda memo information can be searched for based on only the date and time information. Therefore, it is difficult to search for and browse the stored agenda memo information in association with, for example, a conference which is held later.

The present invention is made in light of the problem, and may provide a communication system, a communication management apparatus, and a program having an enhanced and facilitated registration function to register the related information generated during communications and browsing function to browse the registered related information.

It should be noted that the present invention may also include, but is not limited to, a method, an apparatus, a system, a computer program, and a recording medium to which an element or an expression of the present invention or any combination of the elements of the present invention is applied as an embodiment of the present invention.

In the following, embodiments of the present invention are described with reference to the accompanying drawings.

System
Entire Configuration

First, before the contents of the present invention are specifically described, an entire configuration is described.

Figure 1:
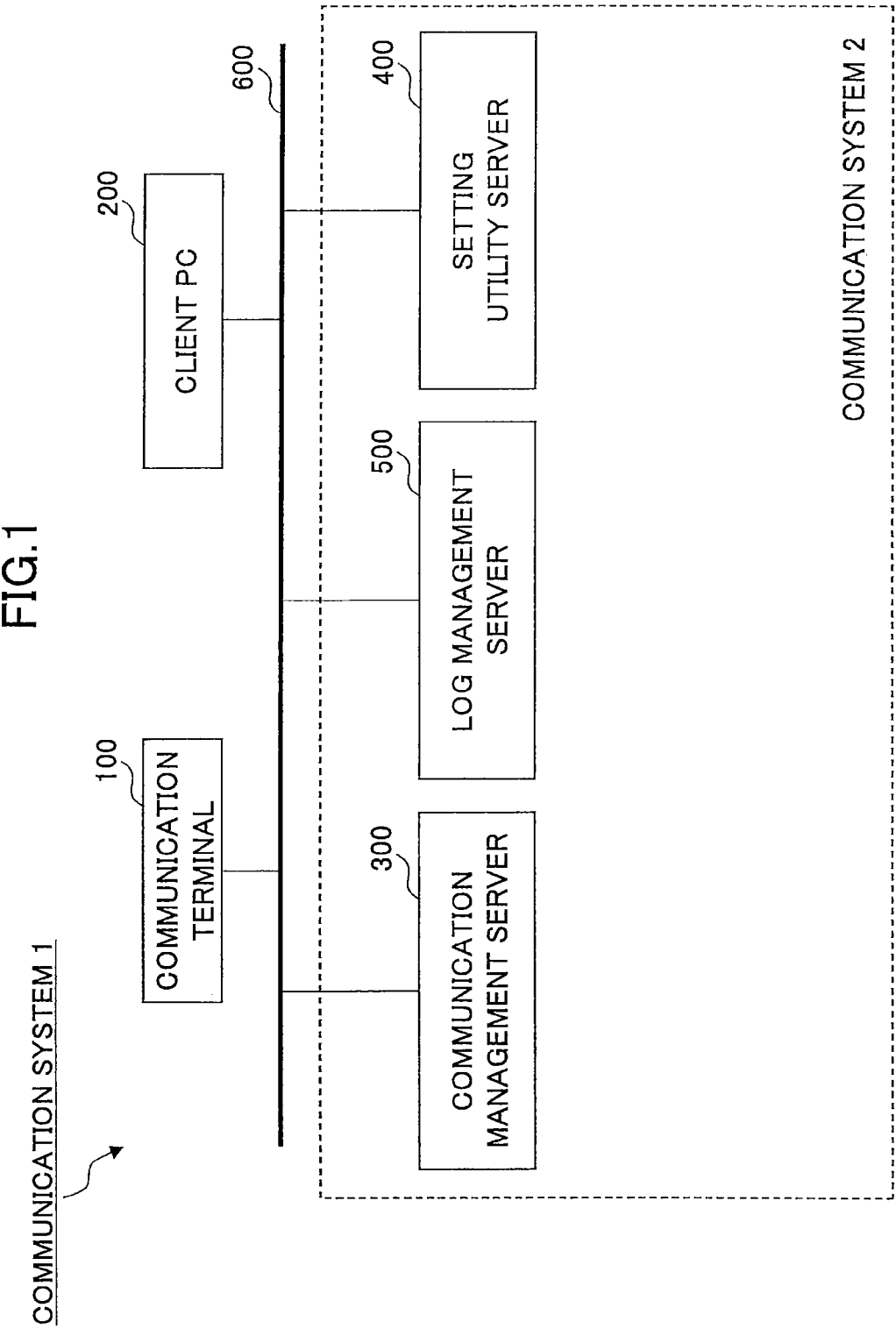
FIG. 1 schematically illustrates a communication system 1 according to an embodiment.

FIG. 1 schematically illustrates a communication system 1 according to an embodiment. The communication system 1 includes a communication terminal 100, a client Personal Computer (PC) 200, a communication management server 300, a setting utility server 400, and a log management server 500, which are mutually connected via a network 600.

The communication system 1 includes a data presentation system, which transmits contents data from one communication terminal 100 to another communication terminal 100 in one direction via a communication system 2, and a communication system which mutually transmits video data and voice data among a plurality of the communication terminals 100. As an example of the communication system, there is, for example, a television conference system or a television telephone system.

The communication terminal 100 transmits and receives video data (including, for example, moving image data, still image data, and voice data) as an example of communication contents data that are transmitted and received between other communication terminals. By doing this, a television conference can be achieved among the communication terminals 100.

The client PC 200 accesses the setting utility server 400 and serves as a PC to browse a conference attendance record and register and browse related information (e.g., agenda memo and attached file) that is registered during the conference.

The communication management server 300 achieves the communications between the communication terminals 100 by performing communication control between the communication terminals 100, management of the communication terminals 100, and generation of the log information related to the communications. The communication terminals 100 establish a session based on the communication control via the communication management server 300 and achieve, for example, the television conference by mutually transmitting and receiving the video data based on the established session. Here, the video data may be transmitted and received between the communication terminals 100 via the communication management server 300.

The setting utility server 400 supplies various settings and functions such as to browse the conference attendance record and register and browse the related information to the client PC 200.

The log management server 500 manages the log information related to the communication performed among the communication terminals 100. For example, the log management server 500 receives the log information from the communication management server 300. Further, the log management server 500 supplies the formatted log information (e.g., a list of the conference attendance record information) in response to a request from the setting utility server 400.

The network 600 herein refers to a communication network including the Local Area Network (LAN) and the Wide Area Network (WAN). The WAN may include a public line.

Here, a case is described where the communication management server 300, the setting utility server 400, and the log management server 500 are separately provided. However, the present invention is not limited to this configuration. For example, those servers may be integrated into a single apparatus such as the communication management server 300, or any combination of the servers may be integrated.

Further, as described below with reference to FIG. 2, it is assumed that the communication terminal 100 is a dedicated terminal for the television conference system. This is because the client PC 200 is separately provided as a terminal to access the setting utility server 400. However, the communication terminal 100 may be achieved by a PC by installing the dedicated application into the PC. In this case, the communication terminal 100 is a PC, therefore, the communication terminal 100 may also serve as the client PC 200.

Hardware Configuration
Communication Terminal 100

Figure 2:
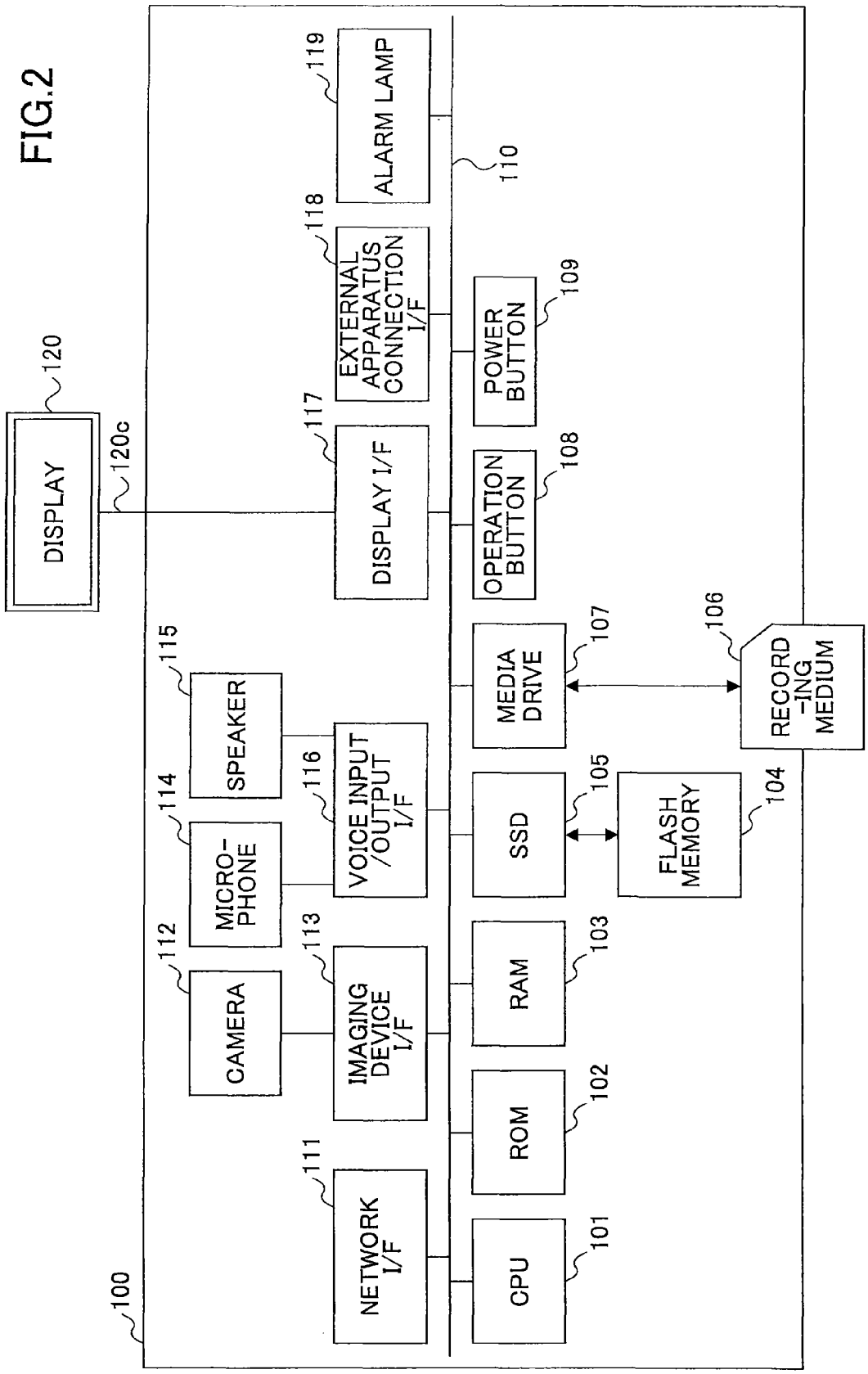
FIG. 2 illustrates a hardware configuration of a communication terminal 100 according to an embodiment.

FIG. 2 is an example hardware configuration of the communication terminal 100 according to an embodiment. The communication terminal 100 in this embodiment includes a Central Processing Unit (CPU) 101, which controls the entire operations of the communication terminal 100, a Read Only Memory (ROM) 102, which stores a program to be used to drive the CPU 101 such as an Initial Program Loader (IPL), a Radom Access Memory (RAM) 103, which is used as a working area of the CPU 101, a flash memory 104, which stores various data including a terminal program, the image data, and the voice data, a Solid State Drive (SSD) 105, which controls writing and reading the various data to and from the flash memory 104 based on the control by the CPU 101, a media drive 107, which controls the reading and the writing (storing) data from and to a recording medium 106 such as a flash memory, an operation button 108, which is to be operated when, for example, the address of the communication terminal 100 is selected, a power button 109 to switch on/off the power of the communication terminal 100, and a network Interface (I/F) 111 to transmit data via the network 600.

Further, the communication terminal 100 further includes a built-in type camera 112 to acquire image data by imaging an object under the control of the CPU 101, an imaging device I/F 113 to control the drive of the camera 112, a built-in type microphone 114 to input voice, a built-in type speaker 115 to output voice, a voice input/output I/F 116 to perform input and output processes on the voice signals between the microphone 114 and the speaker 115 under the control of the CPU 101, a display I/F 117 to transmit image data to an external display 120 under the control of the CPU 101, an external apparatus connection I/F 118 to connect various external apparatuses, an alarm lamp 119 indicating a failure of the various functions of the communication terminal 100, and a bus line 110 including address bus lines and data bus lines to electrically connect the above elements with each other.

The display 120 is a display part which is made of, for example, liquid crystal or organic EL so as to display, for example, an image of the object and icons for the operations.

Further, the display 120 is connected to the display I/F 117 using a cable 120c. The cable 120c may be, for example, an analog RGB (VGA) cable, a component video cable, a High-Definition Multimedia Interface (HDMI) signal cable, or Digital Video Interface (DVI) signal cable.

The camera 112 includes a lens and a solid-state image sensing device which converts an optical image to an electric signal and digitizes the image (video) of the object. As the solid-state image sensing device, for example, a Complementary Metal Oxide Semiconductor (CMOS) or a Charge Coupled Device (CCD) may be used.

The external apparatus connection I/F 118 can be electrically connected to an external apparatus such as an external camera, an external microphone, or an external speaker by using, for example, a Universal Serial Bus (USB) cable which is plugged into a connection port (not shown) on the chassis of the communication terminal 100. When the external camera is connected, the external camera is driven and used prior to the use of the built-in type camera 112 under the control of the CPU 101. Similarly, when the external microphone or the external speaker is connected, the external microphone or the external speaker is driven and used prior to the use of the built-in type microphone 114 or the built-in type speaker 115, respectively, under the control of the CPU 101.

The recording medium 106 is detachably mounted on the communication terminal 100. As the recording medium 106, a non-volatile memory, such as an Electrically Erasable and Programmable ROM (EEPROM) that can read and write data under the control of the CPU 101 may alternatively be used instead of using the flash memory 104.

It is not always necessary that the camera 112, the microphone 114, and the speaker 115 are the built-in type. As described above, for example, the external camera, the external microphone, or the external speaker may alternatively be used.

Communication Management Server 300

Figure 3:
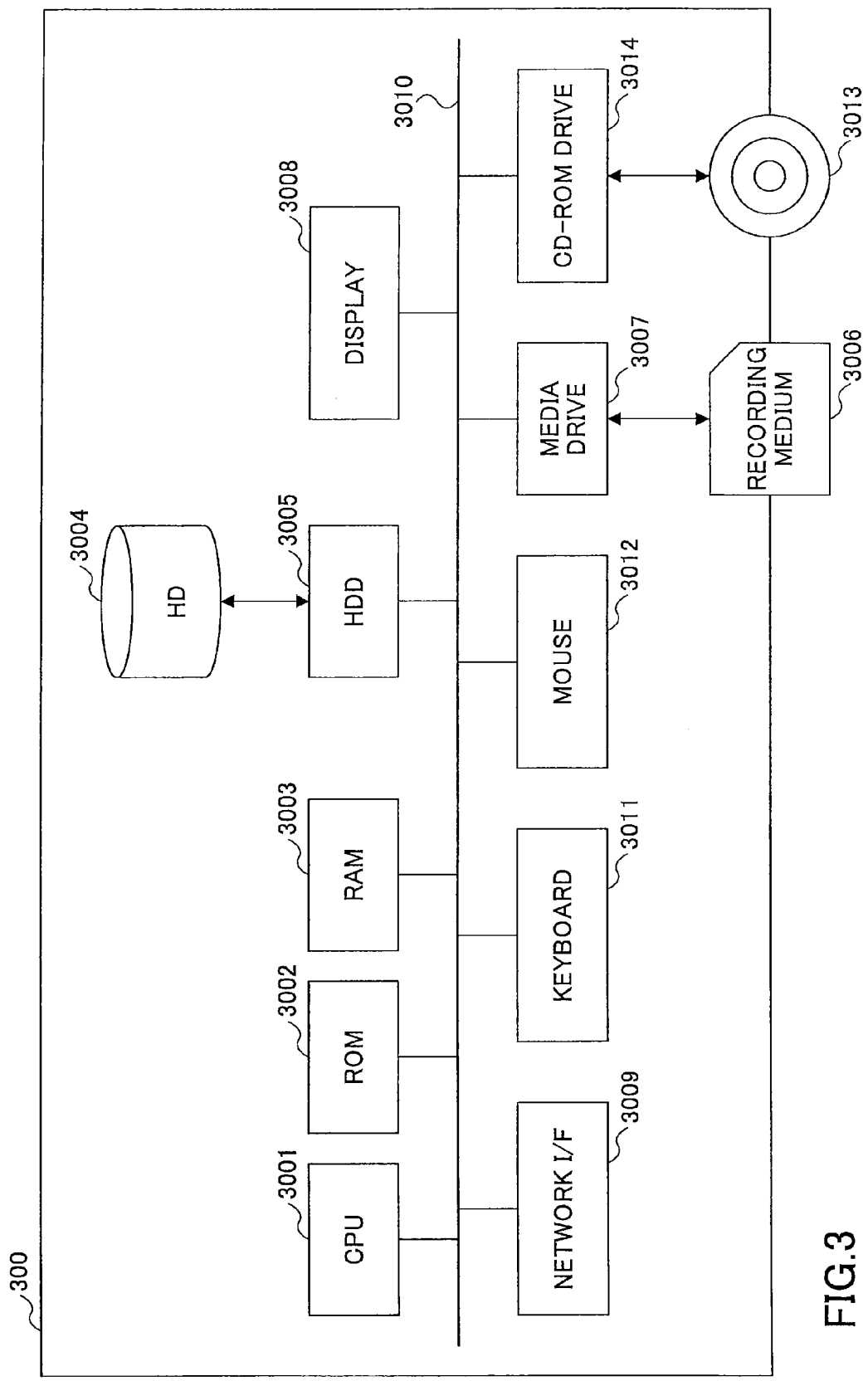
FIG. 3 illustrates a hardware configuration of a communication management server 300 according to an embodiment.

FIG. 3 illustrates a hardware configuration of the communication management server 300 according to an embodiment. The communication management server 300 includes a CPU 3001, which controls the entire operations of the communication management server 300, a ROM 3002, which stores a program to be used to drive the CPU 3001 such as the IPL, a RAM 3003, which is used as a working area of the CPU 3001, an HD 3004, which stores various data including, for example, a program for transmission management, a Hard Disk Drive (HDD) 3005, which controls writing and reading the various data to and from the HD 3004 based on the control by the CPU 101, a media drive 3007, which controls reading and writing (storing) data from and to a recording medium 3006 such as a flash memory, a display 3008, which displays various information such as a cursor, a menu, a window, a character, and an image, a network I/F 3009 to transmit data via the network 600, a keyboard 3011 having a plurality of keys to input a character, a value, various instructions and the like, a mouse 3012 to, for example, move a cursor, a Compact Disc Read Only Memory (CD-ROM) drive 3014, which controls reading of various data from a CD-ROM 3013 as an example of a detachable recording medium, and a bus line 3010 including address bus lines and data bus lines to electrically connect the above elements between each other.

Here, it is assumed that the configurations of the setting utility server 400 and the log management server 500 are similar to that of the communication management server 300. Therefore, repeated description thereof is herein omitted.

Functions

Next, the functions of the servers according to an embodiment are described.

Figure 4:
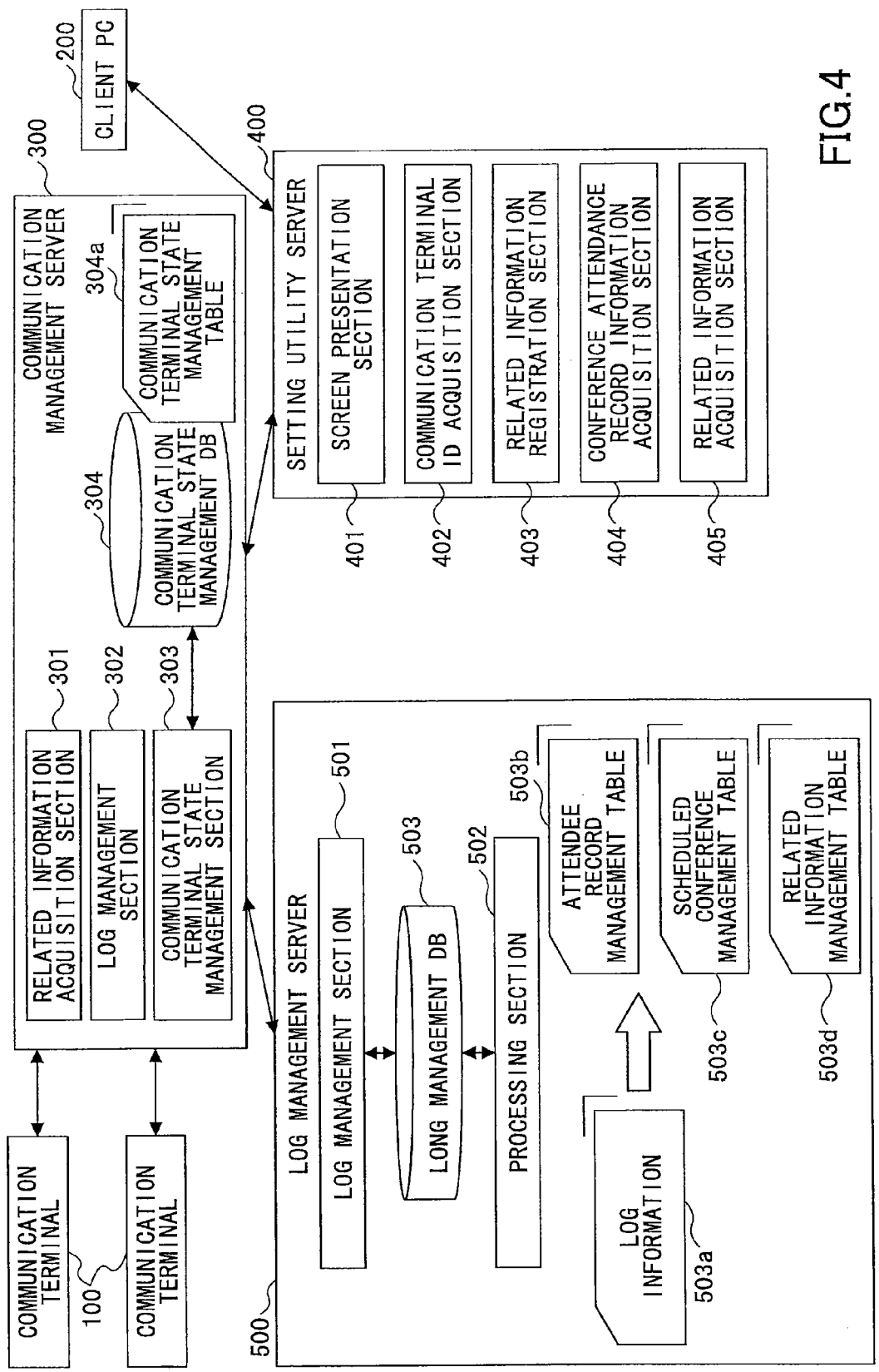
FIG. 4 is a functional block diagram of the communication management server 300, a setting utility server 400, and a log management server 500 according to an embodiment.

FIG. 4 is a functional block diagram of the communication management server 300, the setting utility server 400, and the log management server 500, which are described below.

Communication Management Server 300

The communication management server 300 includes a related information acquisition section 301, a log management section 302, a communication terminal state management section 303, and a communication terminal state management database (DB) 304.

The related information acquisition section 301 acquires related information which is related to the communications between the communication terminals 100. Specifically, as described below, the client PC 200 registers the related information (e.g., an agenda memo and an attached file) in the setting utility server 400. Here, the related information is related to a conference which is held between the communication terminals 100. The setting utility server 400 transmits the related information, which is registered by the client PC 200, to the communication management server 300. Therefore, the related information acquisition section 301 of the communication management server 300 receives (acquires) the related information.

The log management section 302 acquires the communication log information (log information) of the communications between the communication terminals 100, and may generate a part of the log information. The log management section 302 transmits the log information to the log management server 500. Further, as described below, when the related information is transmitted from the setting utility server 400, the log management section 302 generates the log information which relates to the related information.

The communication terminal state management section 303 manages the states of the communication terminals 100 by using the communication terminal state management DB 304. As examples of the states of the communication terminals 100, there are "in conference" state and "waiting" state.

The communication terminal state management DB 304 includes a communication terminal state table to manage the states of the communication terminals 100.

Communication Terminal State Table

FIG. 5 illustrates an example of the communication terminal state table. As shown in FIG. 5, a communication terminal state management table 304a stores state information of the communication terminals 100. Here, the term "state information" refers to the information indicating a state of a communication terminal (i.e., which communication terminal is currently in which state).

Specifically, the communication terminal state management table 304a includes data items which are "terminal ID", "state", "conference ID", and "conference session ID".

The "terminal ID" refers to the identification information to identify the communication terminal 100, and indicates, for example, a unique ID (identifier). Further, the "terminal ID" includes the identification information to identify a user of the communication terminal 100.

The "state" refers to a current state of the communication terminal 100. The "waiting" of the "state" refers to the state where the communication terminal 100 is in a "not-attending state" in a conference. The "in conference" of the "state" refers to the state where the communication terminal 100 is in a "attending state" in a conference.

The "conference ID" refers to the ID (identification information) to identify the attending conference (communications) when the communication terminal 100 is in a "attending state" in the conference. Therefore, when the "state" is "waiting", the value of the "conference ID" is empty (null).

Whenever a new conference is held, the corresponding new number is assigned as the "conference ID".

Here, the term "conference" refers to general communications, and the "conference ID" is the identification information to identify the communications which are held using the communication terminals 100. For example, the communications include the communications between friends and the communications between families. The "conference ID" described below has the same contents.

The "conference session ID" refers to the ID to identify the conference session which starts when a user of the communication terminal 100 joins a conference and ends when the user of the communication terminal 100 leaves the conference in a case where the communication terminal 100 is in a "attending state" in the conference.

For example, when a user of the communication terminal 100 joins a conference and leaves the conference several times, the respective "conference session IDs" having different values are generated. Further, when the "state" is "waiting", the value of the "conference session ID" is empty (null).

The ID described above may include, for example, figures, symbols, characters, or an image.

Log Management Server 500

The log management server 500 includes a log management section 501, a processing section 502, and a log management DB 503.

The log management section 501 receives the log information, which is related to the communications between the communication terminals 100, from the communication management server 300. Further, in response to an acquisition request from the setting utility server 400, the log management section 501 transmits the conference attendance record and the related information, which are acquired from the log management DB 503, to the setting utility server 400. As the timing(s) to receive the log information, the log management section 501 may receive the log information whenever the log information is generated or may collectively receive the log information periodically.

The processing section 502 extracts attendee record information, scheduled conference information (held conference information), and the related information, by processing the received log information. The attendee record information, scheduled conference information, and the related information are stored in an attendee record management table 503b, a scheduled conference management table 503c, and a related information management table 503d, respectively, of the log management DB 503.

Namely, the processing section 502 has a role to perform a process on the received log information, so that the log information has a format to be easily used in a view of information processing and those information items can be extracted. Therefore, the extracted attendee record information, scheduled conference information, and the related information, which are the processed information, are based on the received log information.

The log management DB 503 includes the attendee record management table 503b, the scheduled conference management table 503c, and the related information management table 503d. The attendee record management table 503b stores attendee record information (described below). The scheduled conference management table 503c stores schedule conference information (described below). The related information management table 503d stores related information (described below).

Log Information

FIG. 6 illustrates an example of the log information according to an embodiment. As shown in FIG. 6, log information 503a includes data items including a "communication type", a "communication source terminal ID", a "communication destination terminal ID", a "session ID", the "conference ID", the "conference session ID", "communication date and time", and the "related information".

The "communication type" refers to a type of a communication state. The communication state "online" refers to a state where the power of the communication terminal 100 is turned ON. The communication state "offline" refers to a state where the power of the communication terminal 100 is turned OFF (if the communication state is changed to the "offline" during a conference, corresponding values are stored in the "conference ID" and the "conference session ID").

Alternatively, the communication states "online" and the "offline" may refer to the states where the communication terminal 100 is logged in the communication management server 300 and where the communication terminal 100 is logged off the communication management server 300, respectively. The "invite" of the communication state refers to an invitation request to a conference. The "call" of the communication state refers to an attendance request to a conference which is being held. The "accept" of the communication state refers to a permission of the invitation request ("invite") or the attendance request (call).

The "start" of the communication state refers to the start of the conference. The "end" of the communication state refers to the end of the conference. The "join" of the communication state refers to a state where a user of the communication terminal 100 joins a conference. The "leave" of the communication state refers to a state where a user of the communication terminal 100 leaves a conference. The "text" of the communication state refers to a state where text data such as comments are transmitted as the related information. The "file" of the communication state refers to a state where file data such as a conference document are transmitted as the related information.

The "communication source terminal ID" refers to the "terminal ID" to identify the communication terminal 100 as the communication source described with reference to FIG. 5. When "type" is "text" or "file", the "communication source terminal ID" refers to the terminal ID of the communication terminal 100 that transmits the related information.

The "communication destination terminal ID" refers to the "terminal ID" to identify the communication terminal 100 as the communication destination described with reference to FIG. 5.

The "session ID" refers to the ID to identify the session from when the state of the communication terminal 100 is set to the "online" to when the state of the communication terminal 100 is set to the "offline".

The "conference ID" refers to the ID to identify the conference which the user of the communication terminal 100 attends. Whenever a conference is held, the corresponding ID is attached (generated).

The "conference session ID" refers to the ID to identify the conference session which starts when a user of the communication terminal 100 joins a conference and ends when the user of the communication terminal 100 leaves the conference. For example, when a user of the communication terminal 100 joins a conference and leaves the conference several times, the respective "conference session IDs" having different values are generated.

The "communication date and time" refers to the date and time information corresponding to the communication states described above based on the communications by the communication terminal 100.

The "related information" refers to the related information such as the text data or the file data described above that is transmitted from the client PC 200. Further, the related information may be any electrical information that can be uploaded and includes, for example, a file of Word, Excel Power point, a video file, a voice file, and an image file.

The ID described above may include, for example, figures, symbols, characters, or an image.

It should be noted that the data items described above are examples only. For example, any other data item or a value may also be included. Further, in the above description, a case is described where each of the data items (schema) is explicitly defined in such as a table of the DB. However, the log information may further include other items. Therefore, for example, only a text data item such as JSON or XML may be included. FIG. 7 shows a case where the log information is describe in JSON format.

Attendee Record Table

FIG. 8 illustrates an example of an attendee record table according to an embodiment. As shown in FIG. 8, the attendee record table 503b stores the attendee record information. The attendee record information refers to information indicating when and which communication terminal attends (joins) and leaves which conference (i.e., attendance record of an attendee (communication terminal) who attends the conference).

Specifically, the attendee record table 503b includes the data items such as a "record ID", the "terminal ID", the "conference ID", the "conference session ID", a "join date and time", "leave date and time", an "attendance time period", and a "leave state".

The "record ID" refers to an ID to identify attendee record (information).

The "terminal ID" refers to an ID to identify the communication terminal which attends the conference, and is the information based on, for example, the "communication source terminal ID" and the "communication destination terminal ID" of the log information 503a.

The "conference ID" refers to an ID to identify the attended conference, and is the information based on, for example, the "conference ID" of the log information 503a.

The "conference session ID" refers to an ID to identify the conference session which starts from the joining to the leaving the conference, and is the information based on, for example, the "conference session ID" of the log information 503a.

The "join date and time" refers to the date and time when the communication terminal (or the user thereof) joins the conference, and is the information based on, for example, the "communication date and time" of the log information 503a.

The "leave date and time" refers to the date and time when the communication terminal (or the user thereof) leaves the conference, and is the information based on, for example, the "communication date and time" of the log information 503a.

The "attendance time period" refers to a time period which starts when the communication terminal joins the conference and ends when the communication terminal leaves the conference, and is the information based on, for example, the "communication date and time" of the log information 503a.

The "leave state" refers to the leave state of the conference. The "leave" of the "leave state" refers to a state where the communication terminal leaves the conference in a normal manner. Here, the "leave" refers to a normal leave. The "forced termination" refers to the forced termination due to, for example, power shut down. The "in conference" of the "leave state" refers to a state where the communication terminal is attending the conference. The "leave state" is the information based on, for example, the "communication type" and the "communication date and time" of the log information 503a.

Those data items of the attendee record information in the record table 503b are generated by the processing section 502 by processing the received log information.

It is possible to identify the operation record of the communication terminal based on, for example, the "communication source terminal ID", the "communication destination terminal ID", and the "communication type" according to the log information. It is also possible to identify the conference which the communication terminal attends based on, for example, the "conference ID".

It is also possible to identify the date and time of the operation record based on, for example, the "communication date and time". Reference may be made to, for example Japanese Patent Publication No. 2012-195925 for a detailed discussion of performing the process on the log information by the processing section 502.

The ID described above may include, for example, figures, symbols, characters, or an image.

Scheduled Conference Management Table

FIG. 9 illustrates an example of the scheduled conference management table according to an embodiment. As shown in FIG. 9, the scheduled conference management table 503c stores the scheduled conference information. The scheduled conference information refers to the information indicating what conference is held (scheduled) from which date and time to which date and time hosted by which host (organizer) (i.e., schedule information of the conference).

The scheduled conference management table 503c includes the data items such as the "conference ID", a "host terminal ID", "start date and time", "end date and time", and "conference time period".

The "conference ID" refers to an ID to identify the attended conference, and is the information based on, for example, the "conference ID" of the log information 503a.

The "host terminal ID" refers to an ID to identify the terminal which serves as a conference host (organizer), and is the information based on, for example, the "communication source terminal ID" and the "communication destination terminal ID" of the log information 503a.

The "start date and time" refers to the start date and time of the entire conference, and is the information based on, for example, the "communication type", the "conference ID", and the "communication date and time" of the log information 503a.

The "end date and time" refers to the end date and time of the entire conference, and is the information based on, for example, the "communication type", the "conference ID", and the "communication date and time" of the log information 503a.

The "conference time period" refers to the time period of the entire conference, and is the information based on, for example, the "start date and time" and the "end date and time" described above.

Those data items of the scheduled conference information in the scheduled conference management table 503c are generated by the processing section 502 by processing the received log information as described above.

Related Information Management Table

FIG. 10 illustrates an example of the related information management table according to an embodiment. As shown in FIG. 10, the related information management table 503d stores the related information. The related information refers to the information indicating, for example, which related information is registered in which conference by which communication terminal.

The related information management table 503d includes the data items such as the "conference ID", a "related information ID", the "terminal ID", "transmission date and time", a "type" and "data".

The "conference ID" refers to an ID to identify the conference with which the related information is associated, and is the information based on the "communication type" (in a case of the "text" or "file") and the "conference ID" of the log information 503a.

The "related information ID" refers to an ID to identify the related information.

The "terminal ID" refers to an ID to identify the communication terminal which stores the related information, and is the information based on, for example, the "communication type" (in a case of the "text" or "file") and the "communication source terminal ID" of the log information 503a.

The "transmission date and time" refers to the date and time when the related information is transmitted and registered, and is the information based on, for example, the "communication type" (in a case of the "text" or "file") and the "communication date and time" of the log information 503a.

The "type" refers to the type of the related information. As examples of the "type", there are "text" and "file". The "type" is the information based on the "communication type" (in a case of the "text" or "file") of the log information 503a. It should be noted that "type" may include another type other than the "text" and the "file".

The "data" refer to the data of the related information, and is the information based on, for example, the "related information" of the log information 503a.

Setting Utility Server 400

The setting utility server 400 includes a screen presentation section 401, a communication terminal ID acquisition section 402, a related information registration section 403, a conference attendance record information acquisition section 404, and a related information acquisition section 405.

The screen presentation section 401 receives a display request for displaying a setting utility screen from the client PC 200, and transmits various screen data to the client PC 200.

The communication terminal ID acquisition section 402 acquires the terminal ID of the communication terminal from the client PC 200. For example, the communication terminal ID acquisition section 402 may acquire the terminal ID of the communication terminal which has been acquired during the log-in operation via the setting utility screen.

The related information registration section 403 registers the related information which has been registered from the client PC 200 via the setting utility screen. In the screen for the registration of the related information, it is possible to register the related information including texts and an attached file. When the related information is transmitted (uploaded), the related information registration section 403 transmits the related information to the communication management server 300 so as to acquire and register the related information.

The conference attendance record information acquisition section 404 acquires a list of the conference attendance record information of the communication terminal from the log management server 500 by using the information of the terminal ID of the communication terminal and the conference holding period (based on, for example, the "start date and time" and the "end date and time") as a search key. The screen presentation section 401 displays the acquired conference attendance record information in a list format on the client PC 200.

The related information acquisition section 405 acquires the related information of the conference from the log management server 500 by using the "conference ID" as a search key. The screen presentation section 401 displays the acquired related information in a list format on the client PC 200.

Registration of Related Information
Registration Process of Related Information

Figure 11:
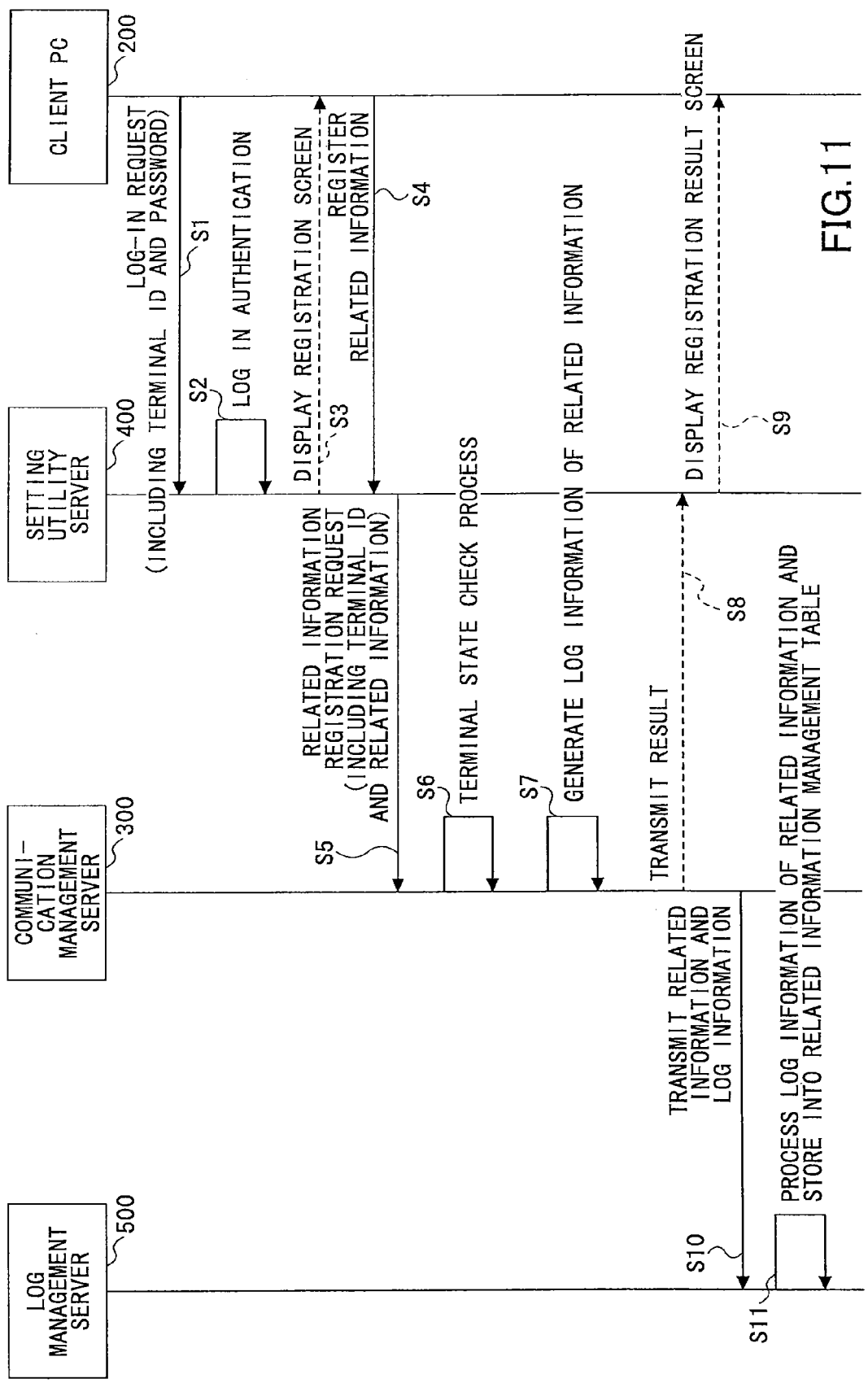
FIG. 11 is a sequence diagram of a registration process of registering related information.

FIG. 11 is sequence diagram of a registration process of registering the related information according to an embodiment. By the registration process, the related information is stored in the related information management table 503d of the log management server 500.

To register the related information, the client PC 200 of a conference attendee accesses the setting utility server 400 and registers the related information (e.g., an agenda memo and an attached file) via a registration screen. The related information may be registered when, for example, the communication terminal 100 is used in a conference. The Details are Described Below.

In step S1, the client PC 200 accesses the setting utility server 400, and logs in the setting utility server 400 using the terminal ID of the communication terminal 100 and the password. Here, as the terminal ID, the terminal ID (e.g., "110001") corresponding to the communication terminal 100 which is being used in the conference.

In step S2, the setting utility server 400 authenticates the log in with the terminal ID and the password. When the log-in authentication is successful, the communication terminal ID acquisition section 402 of the setting utility server 400 acquires the terminal ID used in the log-in process. However, as a log-in ID used in the log-in process, an arbitrary log-in ID other than the terminal ID may alternatively be used as log as the terminal ID corresponding to the arbitrary log-in ID can be finally acquired.

In step S3, when the log-in authentication is successful, the screen presentation section 401 of the setting utility server 400 causes the client PC 200 to display the registration screen by, for example, transmitting the data of the registration screen to the client PC 200.

Figure 12:
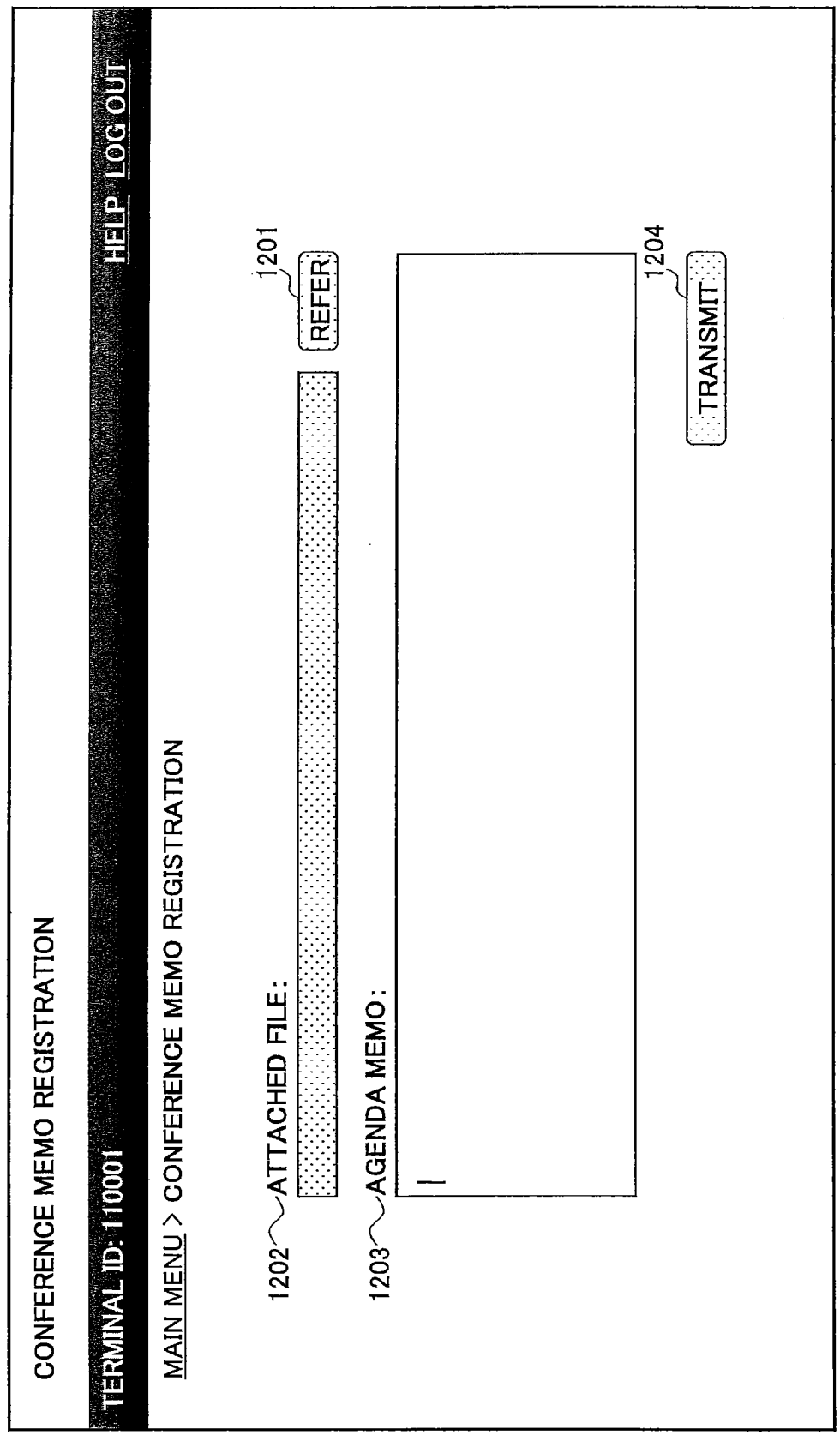
FIG. 12 is an example of a registration screen for registering the related information.

FIG. 12 illustrates the registration screen to register the related information according to an embodiment. When the log-in authentication is successful, the registration screen of FIG. 12 is displayed on the client PC 200.

When an attached file is to be registered, the conference attendee (i.e., the log-in user) presses (clicks) the "refer" 1201 on the registration screen to designate the attached file to be registered. In this case, the attached file to be registered may be designated by a drag-and-drop operation.

Further, when an agenda memo is to be registered, the conference attendee inputs any texts in the text input area of the "agenda memo" 1203. After the input of the texts, the conference attendee presses the "transmission" 1204 on the registration screen to register the texts as the related information.

In step S4, the client PC 200 transmits the related information to the setting utility server 400. Specifically, when the "transmission" 1204 on the registration screen of FIG. 12 is pressed, the related information is transmitted to the setting utility server 400.

In step S5, the related information registration section 403 of the setting utility server 400 transmits a related information registration request which includes the related information registered by the client PC 200 and the terminal ID acquired in step S2 to the communication management server 300. The related information registration request is a request for registration of the related information.

In step S6, when the related information acquisition section 301 of the communication management server 300 receives the related information registration request including the related information and the terminal ID of the communication terminal 100, the state management section 303 checks a state of the communication terminal 100 which is identified by the terminal ID.

For example, the state management section 303 refers to the communication terminal state management table 304*a* of the communication terminal state management DB 304. The state management section 303 then searches the records in the communication terminal state management table 304*a* by using the terminal ID as a search key. The state management section 303 refers to the item of the "state" of the searched records and determines whether the value thereof denotes the "in conference" state (e.g., FIG. 5). When the value denotes the "in conference" state, it is indicated that the communication terminal 100 identified by the terminal ID is in the "in conference" state.

In step S7, when it is indicated that the communication terminal 100 identified by the terminal ID is in the "in conference" state in step S6, the log management section 302 of the communication management server 300 generates the log information of the related information. However, if the communication terminal 100 identified by the terminal ID is not in the "in conference" state, the log management section 302 does not generate the log information of the related information. This is because the registration of the related information is permitted only in the conference.

FIG. 13 illustrates an example of the log information of the related information according to an embodiment. In the "communication type", either "text" or "file" is set (input) based on the type of the related information. In the "communication source terminal ID", the terminal ID acquired in step S5 is set. In the "conference ID" and the "conference session ID", the values corresponding to the "terminal ID" acquired from the communication terminal state management table 304*a* in step S5 are acquired and set (see, for example, FIG. 5).

In the "communication date and time", the current date and time data are set. In the "related information", the related information acquired in step S5 is set. By doing this, the log information in which the "conference ID" is in association with the "related information" is generated.

In step S8, the communication terminal state management section 303 transmits the result of the process in step S6 to the setting utility server 400. When it is indicated that the communication terminal 100 identified by the terminal ID is in the "in conference" state in step S6, the communication terminal state management section 303 transmits the result indicating that the registration is permitted ("registration OK"). On the other hand, when it is indicated that the communication terminal 100 identified by the terminal ID is not in the "in conference" state in step S6, the communication terminal 100 identified by the terminal ID is not currently attending any conference.

In this case, it is not permitted to register the related information. Therefore, the communication terminal state management section 303 transmits the result indicating that the registration is not permitted ("registration NG").

In step S9, the screen presentation section 401 of the setting utility server 400 displays a registration result screen. Specifically, when the data indicating "registration OK" is received, the screen presentation section 401 causes the client PC 200 to display a registration screen displaying a message such as "registration is completed" by, for example, transmitting the registration screen data to the client PC 200.

On the other hand, when the data indicating "registration NG" is received, the screen presentation section 401 causes the client PC 200 to display the registration screen displaying a message such as "this terminal is not attending a conference, so registration is not permitted" by, for example, transmitting the registration screen data to the client PC 200.

In step S10, the log management section 302 of the communication management server 300 transmits the log information of the related information which is generated in step S7 to the log management server 500.

In step S11, upon the receipt of the log information of the related information from the communication management server 300 (see, for example, FIG. 6), after the processing section 502 of the log management server 500 processes the log information, the log management section 501 of the log management server 500 stores the related information in the related information management table 503*d* (see, for example, FIG. 10).

Browse of Related Information
Browsing Process of Related Information

Figure 14:
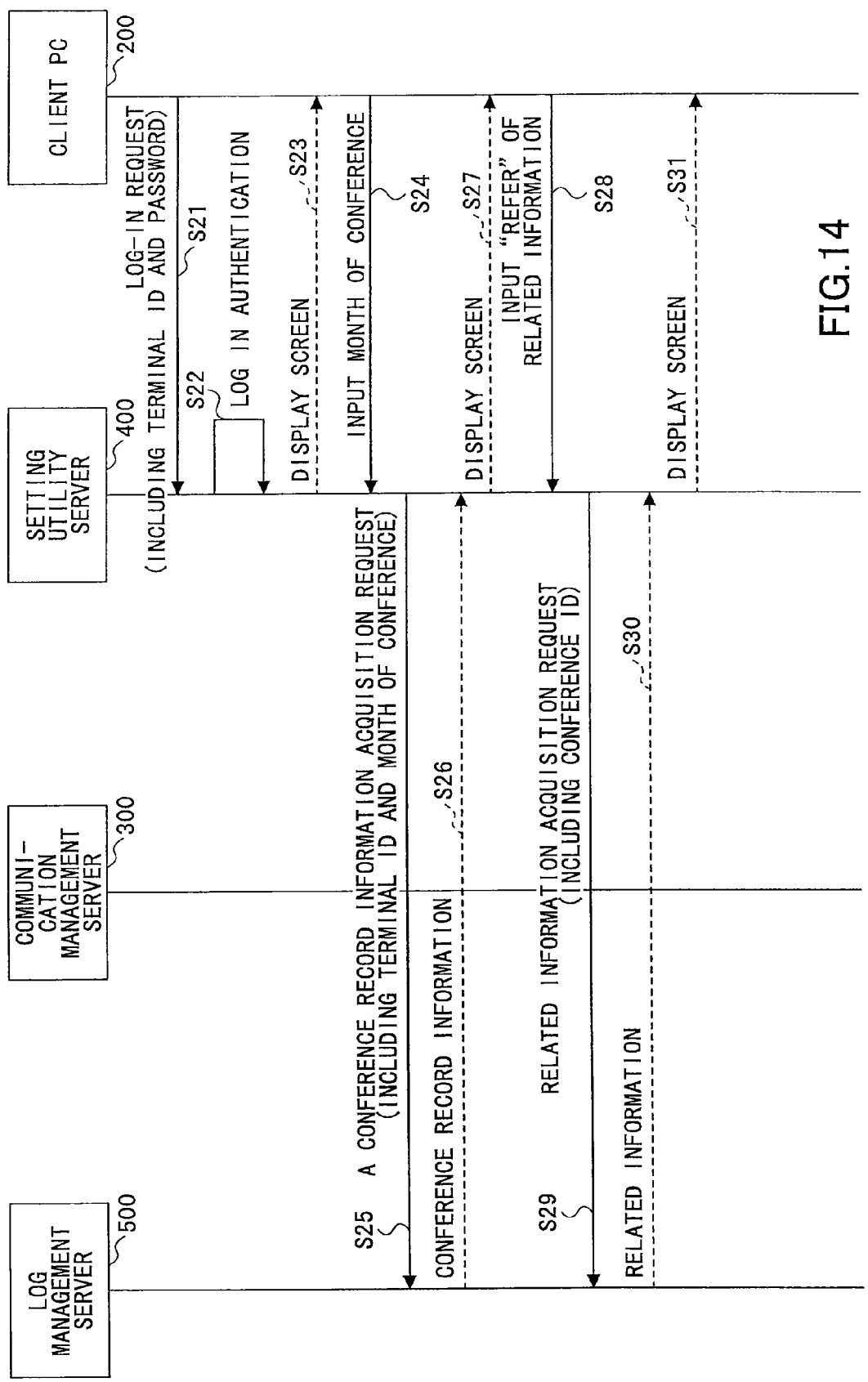
FIG. 14 is a sequence diagram of a browsing process of browsing the related information.

FIG. 14 is a sequence diagram of a browsing process of browsing the related information according to an embodiment. In the browsing process in the sequence diagram, it is assumed that the log management server 500 (the log management DB 503) has the attendee record management table 503*b* and the scheduled conference management table 503*c*.

In step S21, the client PC 200 accesses the setting utility server 400, and logs in the setting utility server 400 using the terminal ID of the communication terminal 100 and the password.

In step S22, the setting utility server 400 authenticates the log in with the terminal ID and the password. When the log-in authentication is successful, the communication terminal ID acquisition section 402 of the setting utility server 400 acquires the terminal ID used in the log-in process. However, as a log-in ID used in the log-in process, an arbitrary log-in ID other than the terminal ID may alternatively be used as log as the terminal ID corresponding to the arbitrary log-in ID can be finally acquired.

In step S23, when the log-in authentication is successful, the screen presentation section 401 of the setting utility server 400 causes the client PC 200 to display a browse screen of a conference record by, for example, transmitting the data of the browse screen of the conference attendance record according an embodiment to the client PC 200.

Figure 15:
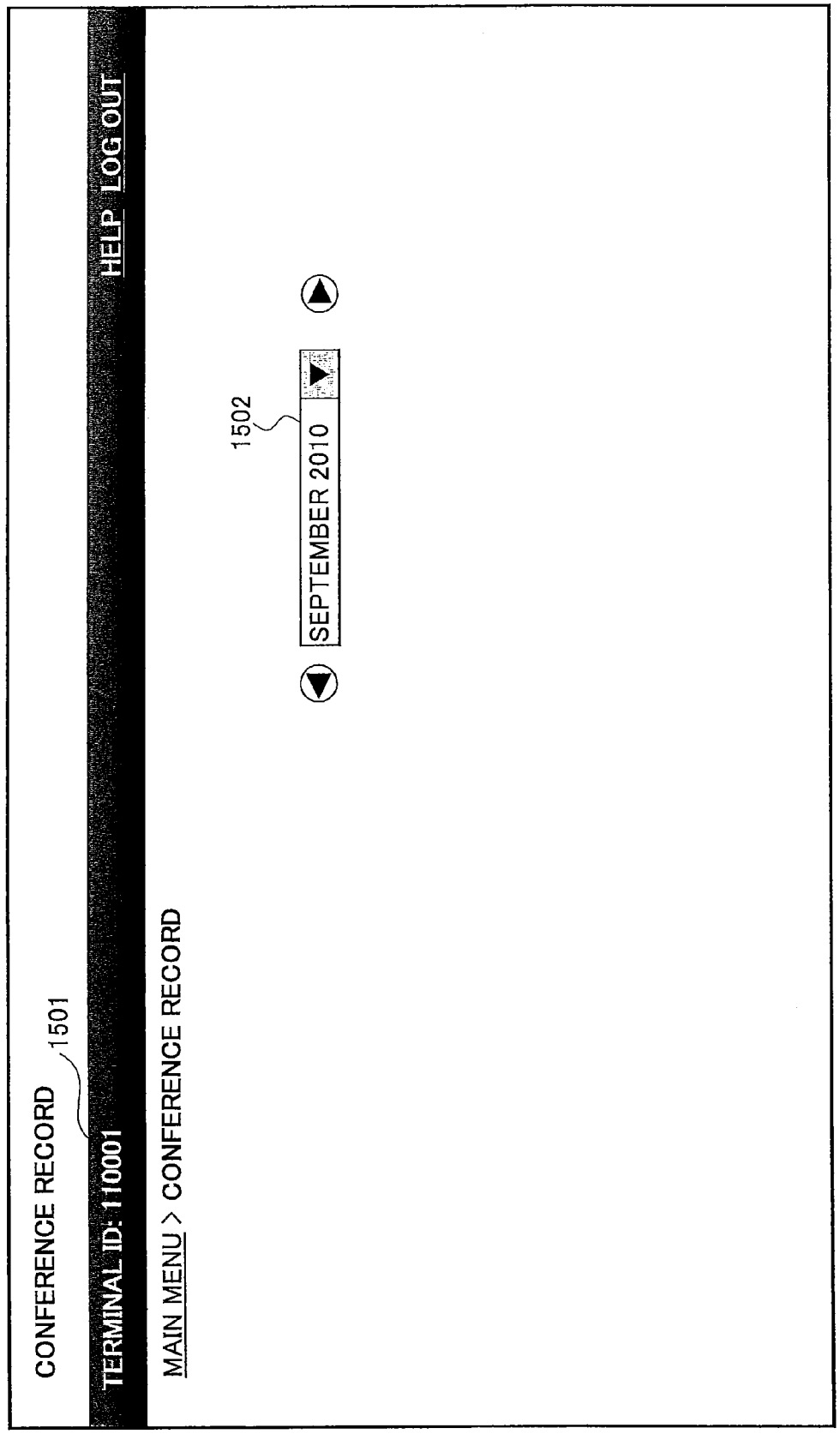
FIG. 15 is an example of a browsing screen of a conference attendance record.

FIG. 15 illustrates an example of the browse screen of the conference attendance record according to an embodiment. When the log-in authentication is successful, the browse screen of the conference attendance record (conference record) of FIG. 15 is displayed on the client PC 200.

In FIG. 15, the terminal ID 1501 indicates the terminal ID of the communication terminal 100 which is used in the log-in operation. In other words, the terminal ID 1501 indicates that a user having the terminal ID is in a log-in state in the setting utility server 400 via the client PC 200.

The drop-down list 1502 is a selection list to select the month when the conference to be browsed was held to browse the related information of the conference which was held in the past. For example, when "September 2010" is selected, a list of conference attendance records of the conferences held in September 2010 is displayed.

When the conference records (conference attendance record) are browsed, a log-in user of the client PC 200 searches for the conference attendance record information of the conferences which the log-in user attended by selecting the month when the conference to be browsed is held from the drop-down list 1502 on the operation screen. Here, the conferences that the log-in user attended are identified based on the terminal ID 1501 (e.g., "110001") of the communication terminal 100 which was used in the conferences that the log-in user attended.

In step S24, the client PC 200 inputs the information of "the month when the conference is (was) held" to the setting utility server 400. Specifically, the log-in user of the client PC 200 selects the month when the conference to be referred to is held from the drop-down list 1502 on the operation screen (e.g., FIG. 15). By doing this, the client PC inputs the information of "the month when the conference is held" (e.g., "September 2010") to the setting utility server 400.

In step S25, when the information of "the month when the conference is held" is input, the conference attendance record information acquisition section 404 of the setting utility server 400 transmits an acquisition request for acquiring the conference attendance record information of the conferences that the identified communication terminal attended and that are held in the input period (designated month) to the log management server 500.

In this case, the conference attendance record information acquisition section 404 designates the terminal ID of the communication terminal 100 (e.g., "110001") and "the month when the conference is held" (e.g., "September 2010") as the parameters.

In step S26, upon receiving the acquisition request for acquiring the conference attendance record information, the log management section 501 of the log management server 500 searches the attendee record management table 503b and the scheduled conference management table 503c of the log management DB 503 by using the terminal ID and the "the month when the conference is held" as the parameters.

The log management section 501 then transmits the conference attendance record information that satisfies the terminal ID (e.g., "110001") and "the month when the conference is held" (e.g., September 2010) as the search result to the setting utility server 400.

Here, among the data items of the conference attendance record information such as the "conference ID", the "join date and time", the "leave date and time", the "attendance time period", and the "leave state" are acquired from the attendee record management table 503b (e.g., FIG. 8). The data items such as the "start date and time" and the "end date and time" are acquired from the scheduled conference management table 503c by using the "conference ID", which is acquired from the attendee record management table 503b, as a key (e.g., FIG. 9).

Further, the log management section 501 refers to the related information management table 503d and then determines whether there exists the related information registered during the conference by using the "conference ID" as a search key.

In step S27, when the conference attendance record information acquisition section 404 of the setting utility server 400 receives the conference attendance record information, the screen presentation section 401 causes the client PC 200 to display a list screen by, for example, transmitting the list screen data including the conference attendance record information to the client PC 200.

FIG. 16 illustrates an example of a list screen of the conference attendance record according to an embodiment. In response to the receipt of the conference attendance record information, the list screen of the conference record of FIG. 15 is displayed on the client PC 200.

In FIG. 16, the conference attendance record information list 1503 refers to a list of the conference attendance record information of the conferences that the log-in user attended and that are (were) held in the month selected by the drop-down list 1502. The conference attendance record information list 1503 has a form in which the column of the data item "related information" is added to the columns of the data items based on the conference attendance record information acquired from the log management server 500. When there is no registered related information, the "refer" 1504 button in the column of the "related information" may not be displayed.

By pressing the "refer" 1504 button in the column of the "related information" of the conference to be browsed, the log-in user can browse the related information registered during the conference.

In step S28, the client PC 200 inputs the "refer" instruction to browse the corresponding related information to the setting utility server 400. Specifically, the log-in user of the client PC presses the "refer" 1504 button of the "related information" of the desired conference among the conference records of the conference attendance record information list 1503. By doing this, the "refer" instruction of the related information is input from the client PC 200 to the setting utility server 400.

In step S29, when the "refer" instruction of the related information is input, the related information acquisition section 405 of the setting utility server 400 transmits an acquisition request for acquiring related information of the input conference to the log management server 500. In this case, the related information acquisition section 405 designates the "conference ID" (e.g., "conf001") as the parameter of the acquisition request for acquiring related information.

In step S30, upon receiving the acquisition request for acquiring related information, the log management section 501 of the log management server 500 searches the related information management table 503d of the log management DB 503 by using a parameter. The log management section 501 then transmits the data of the related information which is in association with the "conference ID" (e.g., "conf001") as the search result to the setting utility server 400.

For example, in FIG. 10, there exist "xxxxx" and "<filename>:<filedata>" as the data sets of the related information which are in association with the "conference ID":"conf001". Both of the data sets are the related information registered during the conference identified by the "conference ID": "conf001". Therefore, when the "conference ID" is "conf001", the log management section 501 transmits those data sets of the related information to the setting utility server 400.

In step S31, upon receiving the data of the related information, the related information acquisition section 405 of the setting utility server 400 causes the client PC 200 to display a browse list screen (browse screen) by, for example, transmitting the browse screen data including the related information to the client PC 200.

FIG. 17 illustrates an example of the browse screen according to an embodiment. When acquiring the data of the related information, the browse screen of the related information of FIG. 17 is displayed on the client PC 200.

In FIG. 17, the "host terminal ID" 1701 refers to an ID to identify the terminal of the conference host of the conference. The "start date and time" 1702 refers to the start date and time of the entire conference. The "end date and time" 1703 refers to the end date and time of the entire conference. The "conference time period" 1704 refers to a time period of the entire conference, and is the information based on the "start date and time" 1702 and the "end date and time" 1703.

The "related information" 1705 refers to the related information such as an agenda memo or an attached file that are registered as the data related to the conference. In the "related information" 1705 of FIG. 17, the data sets of the related information such as agenda memo or an attached file registered by an attendee during the conference of the "conference ID":"conf001" are displayed.

When the related information is an agenda memo, the registered texts are displayed in the "related information" 1705. When the related information is an attached file, the file name of the attached file is displayed. For example, by clicking the file name, the file of the file name may be displayed or downloaded.

As described above, according to this embodiment, by transmitting the related information of the conference via the communication management server 300 by the client PC 200, the related information (log information) can be associated with the "conference ID" of the conference which is held between the communication terminals 100 and then stored in the log management server 500 during the conference.

Further, by doing this, it becomes possible to collectively browse the data sets of the related information that are registered by plural attendees for each of the conference (for each of the "conference ID")

Namely, it becomes possible to easily transmit and browse the related information of the conference which is held between sites. Especially, even in a complicated conference state where, for example, a plurality of the communication terminals 100 join and leave in the middle of one conference, it becomes possible to easily register and browse the related information of the attendees.

Supplementation

In step S26, upon receiving the acquisition request for acquiring the conference attendance record information, the log management section 501 of the log management server 500 searches the attendee record management table 503b and the scheduled conference management table 503c of the log management DB 503 by using the terminal ID and the "the month when the conference is held" as the parameters. In the following, more detail of the search process is described.

First, upon receiving the acquisition request for acquiring the conference attendance record information, the log management section 501 of the log management server 500 calculates "search start date (from_date)" and "search end date (to_date)" based on the "the month when the conference is held" as a parameter.

For example, when "the month when the conference is held" is "September 2010", a search period range starts from Sep. 1, 2010 and ends just before Oct. 1, 2010 (i.e., "search start date (from_date)"=2010-09-01 00:00:00 and "search end date (to_date)"=2010-10-01 00:00:00).

Next, the log management section 501 of the log management server 500 searches the attendee record management table 503b of the log management DB 503 in the search period range from the "search start date (from_date)" to the "search end date (to_date)" by using the "terminal ID" as a key, and extracts the corresponding attendee record information.

Next, the log management section 501 extracts the conference attendee record information from the scheduled conference management table 503c by using the "conference ID" of the extracted attendee record information. The log management section 501 then merges the acquired information (data items). Then, the conference attendee record information having been finally formed as a result of the merge is transmitted to the setting utility server 400 in response to the acquisition request therefrom.

In this embodiment, even when the range the "search start date (from_date)" to the "search end date (to_date)" includes two or more months, it becomes possible to acquire the conference record in the range. For example, in a case where there is attendee record information indicating that a user joined on 2010-08-30 and left on 2010-10-01 (FIG. 8), it becomes possible to acquire data as the data of any of August, September, and October.

To that end, a search condition is determined by using "the terminal ID which satisfies the condition that the period from the "join date and time" to the "leave date and time" overlaps the period in a range from the "search start date (from_date)" to the "search end date (to_date)" among the designated terminal IDs.

FIG. 18 illustrates search conditions according to an embodiment.

The search condition is divided into (1) through (4). By doing this, the search range can be limited (narrower) under each of the conditions. Also, by combining any of the search conditions (1) through (4) by logical "OR" operation, a desired conference record list may be extracted with lower search cost.

Condition (1): the "join date and time" is included in the search period range.
By using this condition (1), the search range of the "join date and time" can be limited to the month of the search period range.

Condition (2): the "leave date and time" is included in the search period range.
By using this condition (2), the search range of the "leave date and time" can be limited to the month of the search period range.

Condition (3): the user (communication terminal) joins the conference before the month of the search period range and is still attending the conference.
By using this condition (3), the search range of the "leave state" can be limited to the "in conference". Unless the user concurrently attends difference conferences, in the identified communication terminal 100, there is only one conference which is in the "in conference" state in the conference record.

Condition (4): the period from the "join date and time" to the "leave date and time" extends more than one month.
By setting that the "attendance time period" is greater than "(search end date (to_date))-(search start date (from_date))" ("more than one month" in the case of FIG. 18), the conference record of the search range can be limited.

Modified Example 1

Figure 19:
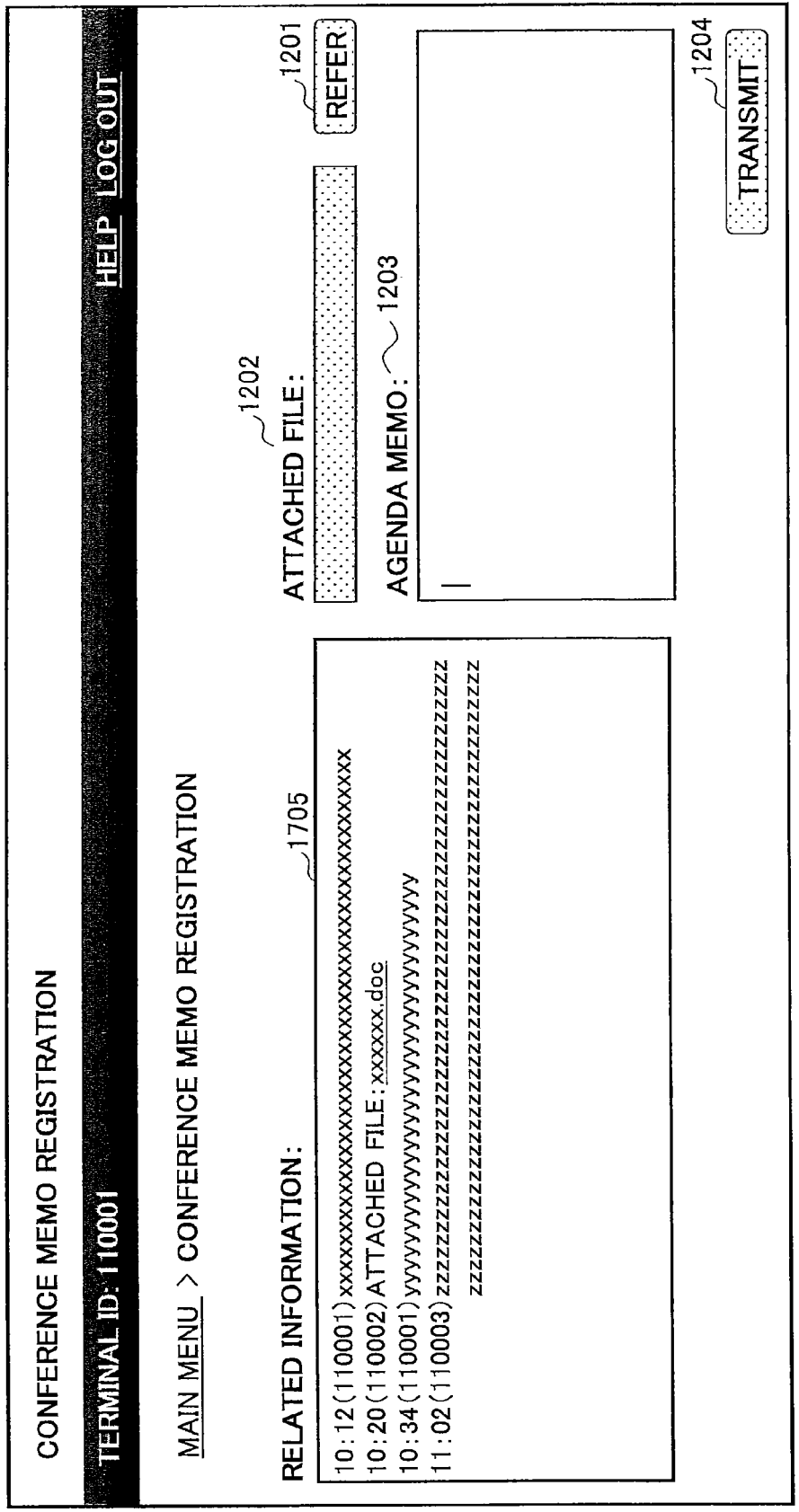
FIG. 19 is an example of the registration screen for registering the related information.

FIG. 19 illustrates an example of the registration screen of the related information according to this modified example. The registration screen in FIG. 19 differs from the registration screen in FIG. 12 in that the item "related information" 1705 is added. Namely, the related information registered by not only the log-in user but also the other conference attendees can be displayed in real time.

The setting utility server 400 transmits the related information registered in this registration screen to the communication management server 300. The communication management server 300 transmits the log information including the related information to the log management server 500.

In this modified example, the communication management server 300 transmits the related information, which is received from the setting utility server 400, to the sessions of the setting utility server 400 that log in using the "terminal IDs" of the communication terminals 100 which are in the "in conference" state (i.e., to the client PCs which log in using the "terminal IDs" of the communication terminals 100 which are in the "in conference" state).

Figure 20:
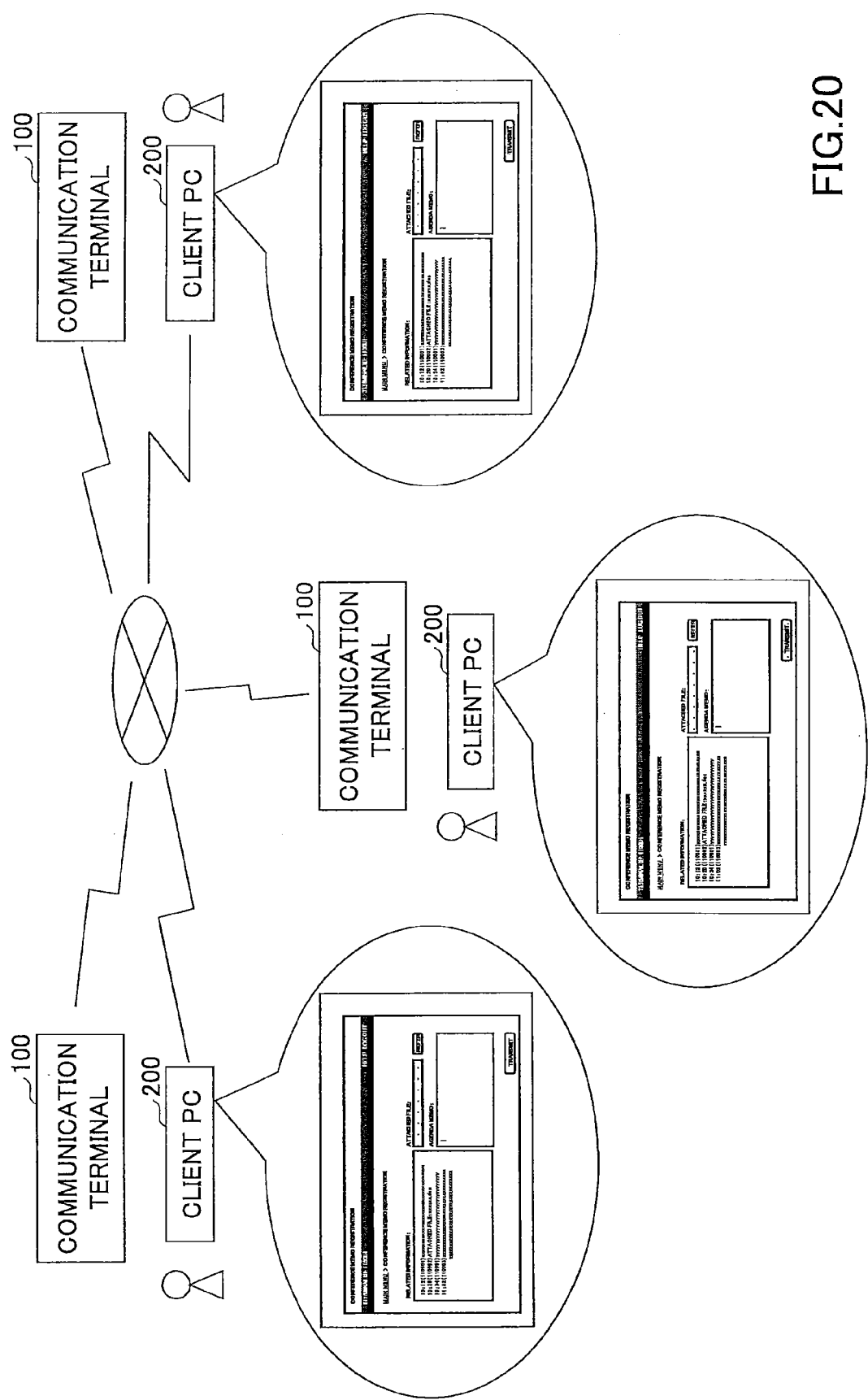
FIG. 20 illustrates relationships with client PCs.

FIG. 20 illustrates the relationships among the client PCs 200. As shown in FIG. 20, for example, while the conference is held among the communication terminals 100 in three sites, the attendees in the sites use the respective client PCs 200 and register the related information.

When the related information is registered from any of the client PCs 200, the setting utility server 400 reflects in real time the related information, which is received from the client PC 200, on the screens of all the client PCs that log in using the respective "terminal IDs" in the same conference.

By doing this, it becomes possible for any one of the conference attendees of the conference to browse in real time all the related information registered not only by the one conference attendee but also by other conference attendees during the conference.

Registration Process of Related Information

Figure 21:
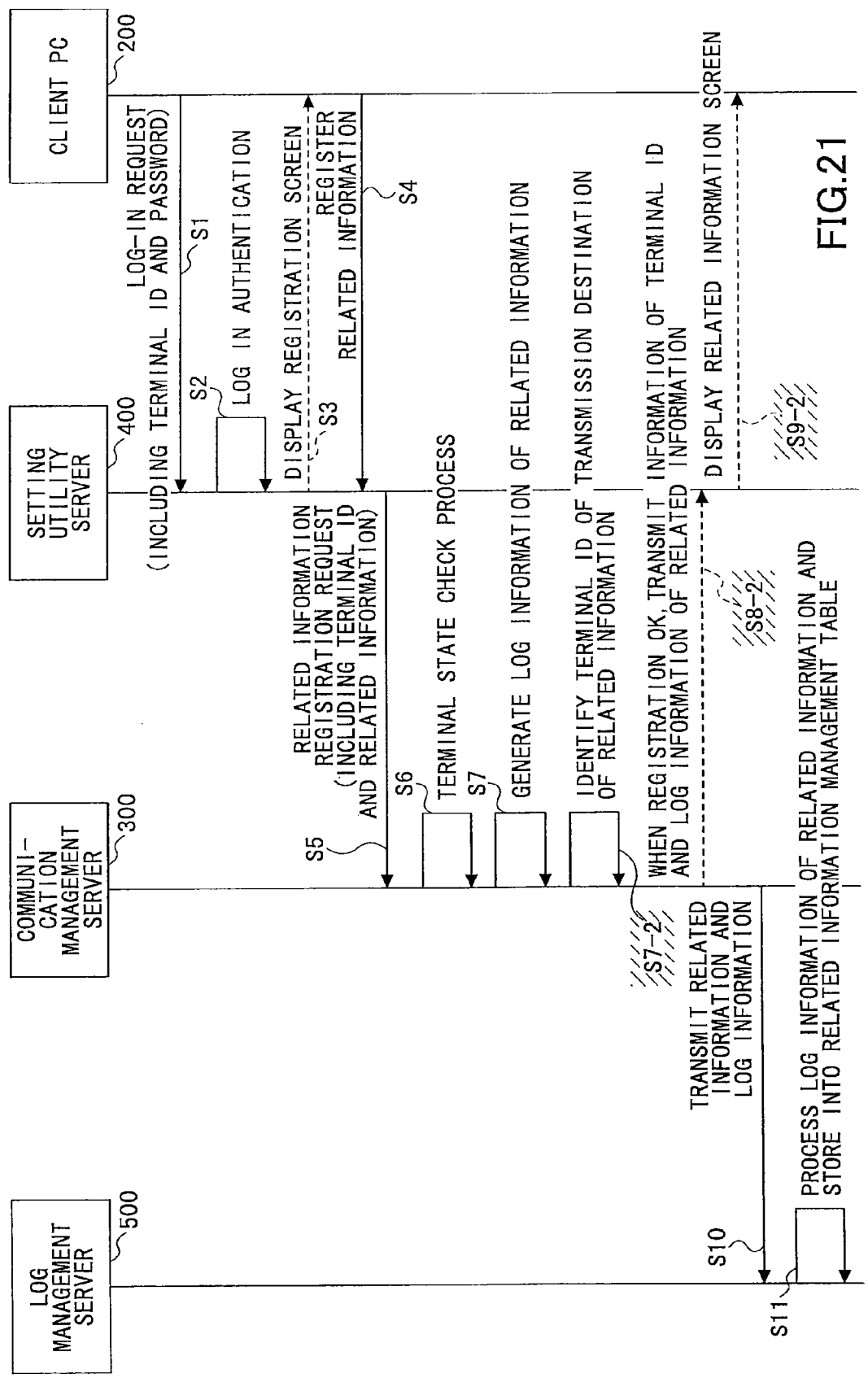
FIG. 21 is a sequence diagram of the registration process of registering the related information.

FIG. 21 is a sequence diagram of the registration process of the related information according to this modified example. The sequence in FIG. 21 differs from that in FIG. 11 in the processes in steps S7-2, S8-2, and S9-2. In the following, these points are mainly described.

In step S3, when the log-in authentication is successful, the screen presentation section 401 of the setting utility server 400 causes the client PC 200 to display the registration screen by, for example, transmitting the data of the registration screen to the client PC 200. The registration screen displayed in this case may be, for example, the registration screen as shown in FIG. 19.

In step S4, the client PC 200 transmits the related information to the setting utility server 400. Specifically, when the "transmission" 1204 on the registration screen of FIG. 19 is pressed, the related information, which is input by the log-in user, is transmitted to the setting utility server 400.

In step S5, the related information registration section 403 of the setting utility server 400 transmits a related information registration request which includes the related information registered by the client PC 200 and the terminal ID acquired in step S2 to the communication management server 300. The related information registration request is a request for registration of the related information.

In step S6, when the related information acquisition section 301 of the communication management server 300 receives the related information registration request including the related information and the terminal ID of the communication terminal 100, the state management section 303 checks a state of the communication terminal 100 which is identified by the terminal ID.

In step S7, when it is indicated that the communication terminal 100 identified by the terminal ID is in the "in conference" state in step S6, the log management section 302 of the communication management server 300 generates the log information of the related information.

In step S7-2, after generating the log information of the related information, the log management section 302 of the communication management server 300 identifies the terminal ID of the transmission destination of the related information. Specifically, first, the log management section 302 refers to the related information management table 503d, and searches for the "terminal ID" attending the "conference ID" (conference) the same as the conference that the "terminal ID" acquired in step S2 attends.

For example, according to the related information management table 503d of FIG. 5, the "conference ID" of the "terminal ID":"110001" is "conf001". Therefore, the "terminal ID" attending (corresponding to) the "conference ID": "conf001" is "110002".

In step S8-2, the communication terminal state management section 303 transmits the terminal ID acquired in step S2 and the information of the terminal ID identified in step S7-2 along with the log information of the related information generated in step S7 to the setting utility server 400.

In step S9-2, upon receiving the log information of the related information along with the information of the terminal ID, the screen presentation section 401 of the setting utility server 400 causes the client PC 200 which logs in using the received terminal ID to display in real time the received related information on the "related information" 1705 of the registration screen by, for example, transmitting the registration screen data including the related information to the client PC 200.

In this case, for example, the screen presentation section 401 of the setting utility server 400 transmits the registration screen data including the related information not only to the client PC 200 which logs in using the "terminal ID":"110001" but also to the client PC 200 which logs in using the "terminal ID":"110002".

By doing this, it becomes possible to display in real time the received related information on the "related information" 1705 of the registration screen of not only the client PC 200 which logs in using the "terminal ID":"110001" but also the client PC 200 which logs in using the "terminal ID":"110002".

As described above, according to this modified example, it becomes possible to display in real time the related information registered by the attendees other than the log-in user on the registration screen of the related information. Namely, it becomes possible to browse the related information registered by the attendees other than the log-in user in real time during the conference as well as to browse all the related information after the conference.

Modified Example 2

Figure 22:
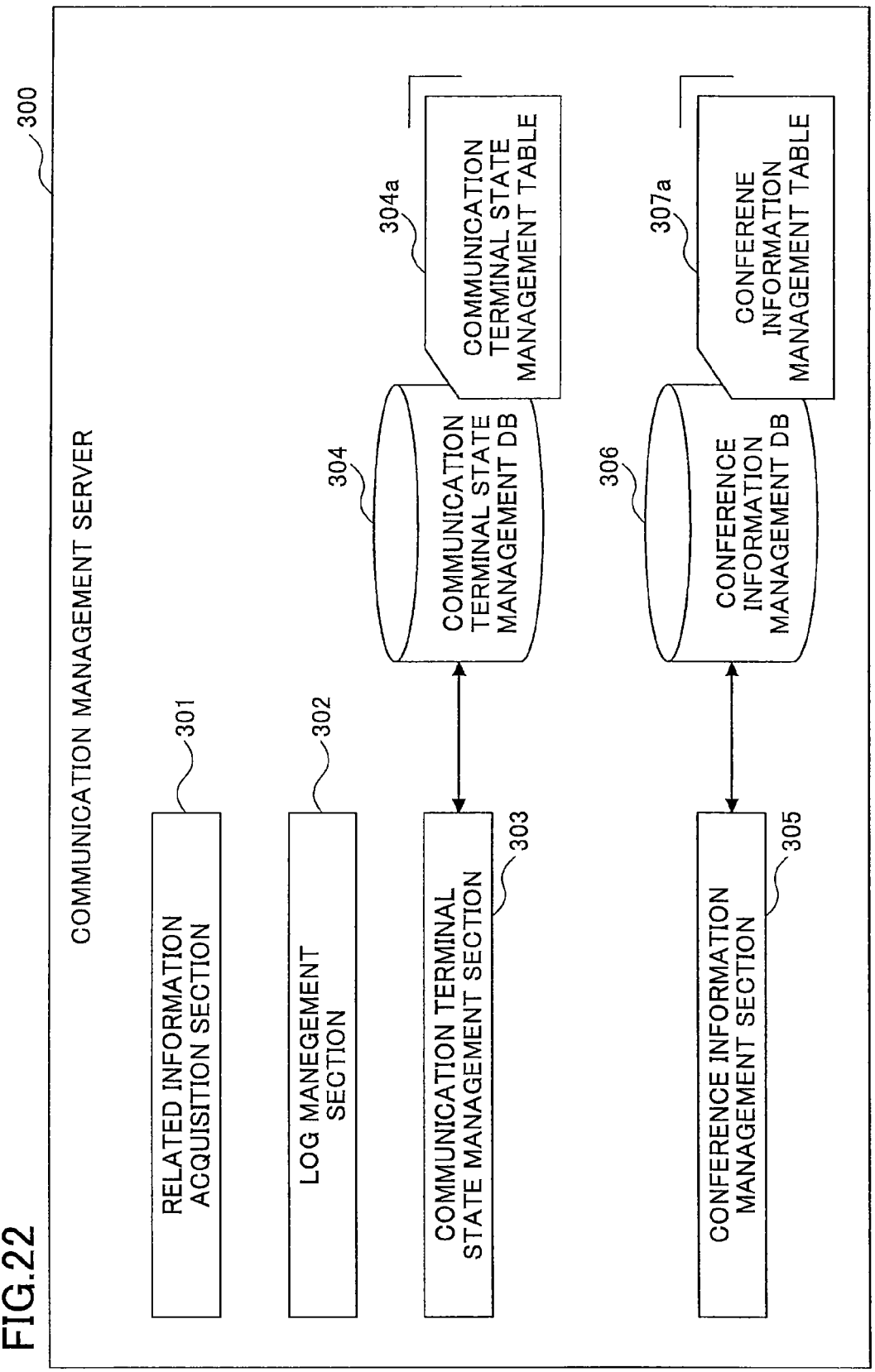
FIG. 22 is a functional block diagram of the communication management server 300.

FIG. 22 is a functional block diagram of the communication management server 300 according to this modified example. The configuration of the communication management server 300 in FIG. 22 differs from that in FIG. 4 in that the communication management server 300 in FIG. 22 further includes a conference information management section 305 and a conference information management DB 306.

The conference information management section 305 manages the conference ID of the conference, the host terminal ID of the conference, and a Private code by using the conference information management DB 306.

The conference information management DB 306 includes a conference information management table 307a.

Conference Information Table

FIG. 23 illustrates an example of the conference information management table 307a according to this modified example. As shown in FIG. 23, the conference information management table 307a includes data items "conference ID", "host terminal ID", and the "Private code".

The "conference ID" is an ID to identify the conference.

The "host terminal ID" is an ID to identify the communication terminal of the conference host of the conference.

The "Private code" refers to an arbitrary character string set by the conference host when a conference is reserved and a conference is started. As described below, the "Private code" is used as a password. The "Private code" may be hashed (encrypted) before being stored.

Registration Process of Related Information

Figure 24:
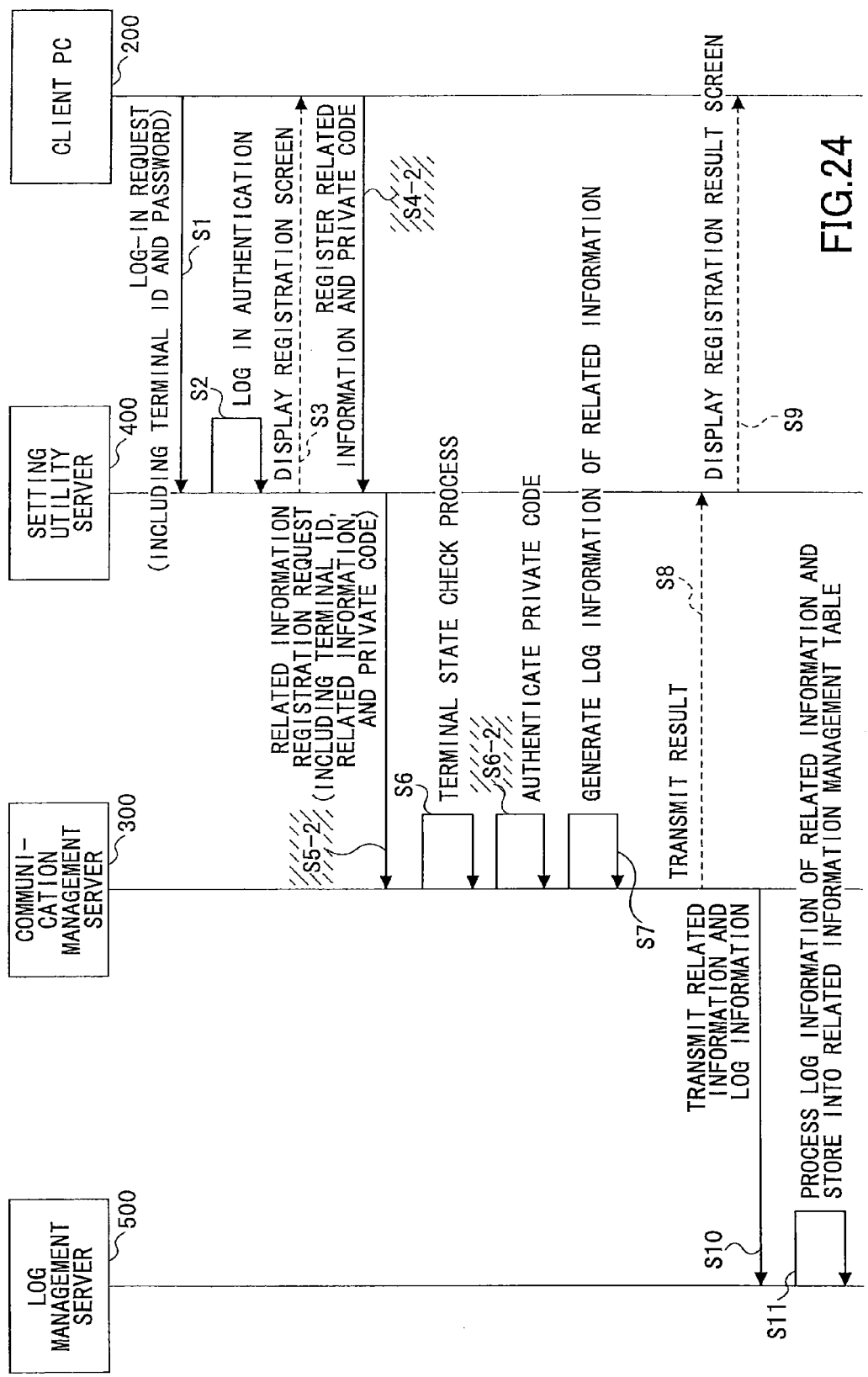
FIG. 24 is a sequence diagram of the registration process of registering the related information.

FIG. 24 is a sequence diagram of a registration process of the related information according to this modified example. The processes in steps S4-2, S5-2, and S6-2 in FIG. 24 differ from those in FIG. 11. In the following, these points are mainly described.

In step S4-2, the client PC 200 transmits the related information and the Private code to the setting utility server 400.

Figure 25:
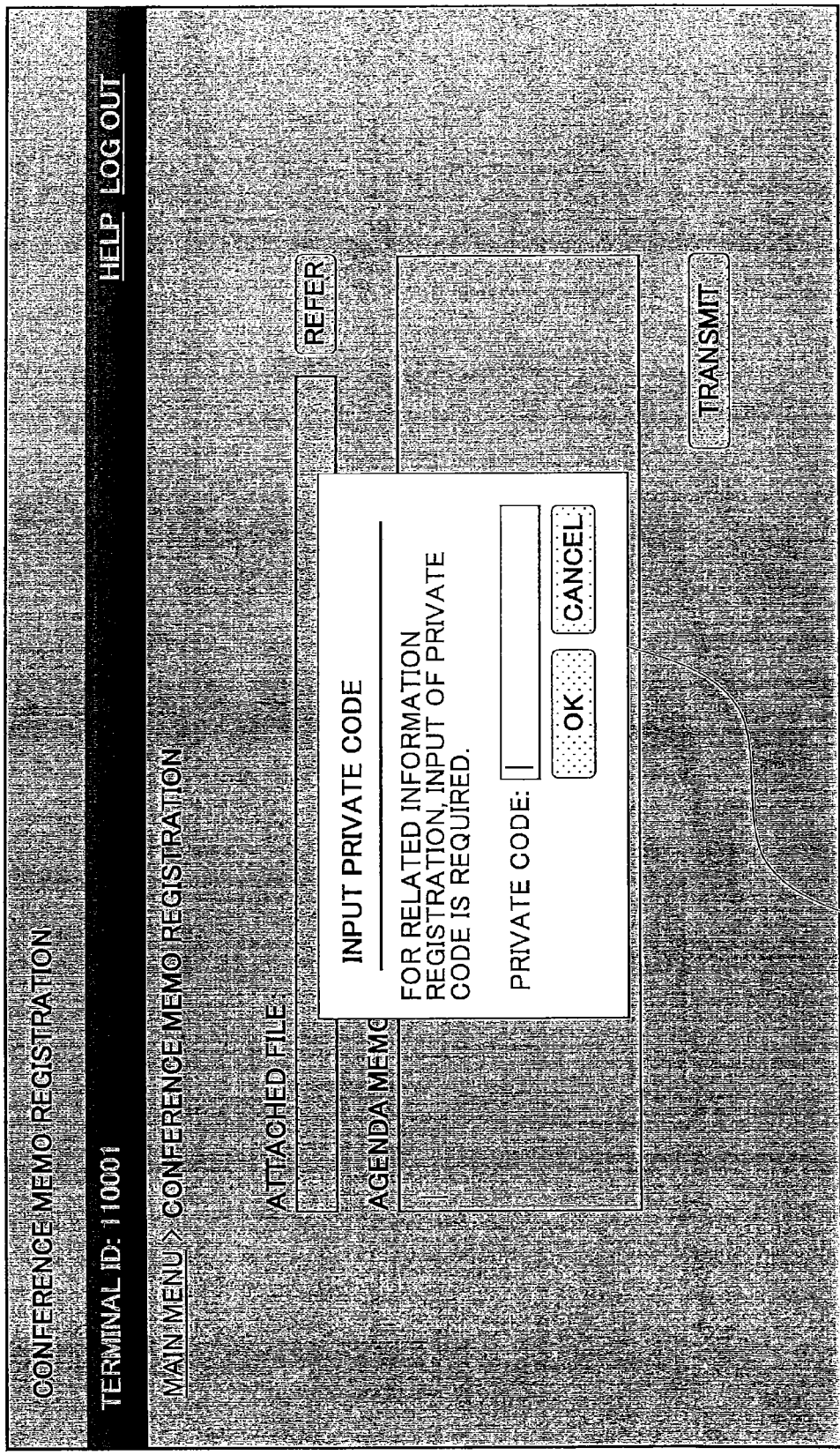
FIG. 25 is an example of the registration screen for registering the related information.

FIG. 25 illustrates an example of the registration screen of the related information according this modified example. In the registration screen (e.g., FIG. 12), when the conference attendee inputs an attached file or texts and presses the "transmission" 1204, a Private code input window 2501 as shown in FIG. 25 is displayed. Namely, in the case of the transmission of the related information, the input of the Private code is prompted to the log-in user who attempts to register the related information.

In step S5-2, the related information registration section 403 of the setting utility server 400 transmits a related information registration request which includes the related information registered by the client PC 200, the terminal ID acquired in step S2, and the Private code input by the client PC 200 to the communication management server 300. The related information registration request is a request for registration of the related information.

In step S6, when the related information acquisition section 301 of the communication management server 300 receives the related information registration request including the related information, the terminal ID, and the Private code, the state management section 303 checks a state of the communication terminal 100 which is identified by the terminal ID.

In step S6-2, when it is determined that the state of the communication terminal 100 is "in conference", the conference information management section 305 of the communication management server 300 checks the Private code.

Specifically, first, the conference information management section 305 refers to the communication terminal state management table 304a and acquires the conference ID corresponding to the terminal ID acquired in step S2. For example, in the communication terminal state management table 304a, the "conference ID" of the "terminal ID":"110001" is "conf001". Next, the conference information management section 305 refers to the conference information management table 307a and acquires the "Private code" corresponding to the acquired conference ID.

The conference information management section 305 then compares the "Private code" acquired from the conference information management table 307a with the Private code input via the client PC. When those Private codes are identical, the conference information management section 305 determines that authentication of the Private code is successful. On the other hand, when those Private codes are not identical, the conference information management section 305 determines that authentication of the Private code has failed.

In step S7, when it is indicated that the communication terminal 100 identified by the terminal ID is in the "in conference" state in step S6 and the authentication of the Private code is successful, the log management section 302 of the communication management server 300 generates the log information of the related information.

In step S8, the communication terminal state management section 303 transmits the results of the processes in steps S6 and S6-2 to the setting utility server 400. When it is indicated that the communication terminal 100 identified by the terminal ID is in the "in conference" state and the authentication of the Private code is successful, the communication terminal state management section 303 transmits the result indicating that the registration is permitted ("registration OK").

On the other hand, when it is indicated that the communication terminal 100 identified by the terminal ID is not in the "in conference" state in step S6 or when it is indicated that the communication terminal 100 identified by the terminal ID is in the "in conference" state in step S6 and the authentication of the Private code has failed, the communication terminal state management section 303 transmits the result indicating that the registration is not permitted ("registration NG").

In step S9, upon receiving the result indicating the "registration NG", the screen presentation section 401 of the setting utility server 400 causes the client PC 200 to display a registration screen by, for example, transmitting the registration screen data to the client PC 200. Specifically, when the state of the communication terminal 100 identified by the "terminal ID" is not "in conference", a message such as "this terminal in not in conference now, so the registration is not permitted" is displayed. When the authentication of the Private code has failed, a message such as "incorrect Private code, so registration is not permitted" is displayed.

As described above, according to this modified example, the Private code is used to control (determination) whether the related information is to be transmitted. By doing this, it becomes possible to control so that only the log-in users including the host who know the respective Private codes can register the related information.

Further, in step S6-2, in a case where the terminal ID is the same as the host terminal ID of the conference, it may be determined that the authentication of the Private code is always successful regardless of whether the Private codes are identical or not. This is because it is thought to be reasonable for the conference host to be always permitted to register the related information of the conference regardless of whether the Private codes are identical or not.

Modified Example 3

FIG. 26 illustrates an example of the scheduled conference management table according to this modified example. The scheduled conference management table 503c-2 of FIG. 26 differs from the scheduled conference management table 503c of FIG. 9 in that the scheduled conference management table 503c-2 further includes the item "Private code".

The "Private code" refers to an arbitrary character string set by the conference host when a conference is reserved and a conference is started. The "Private code" may be hashed (encrypted) before being stored.

Browsing Process of Related Information

Figure 27:
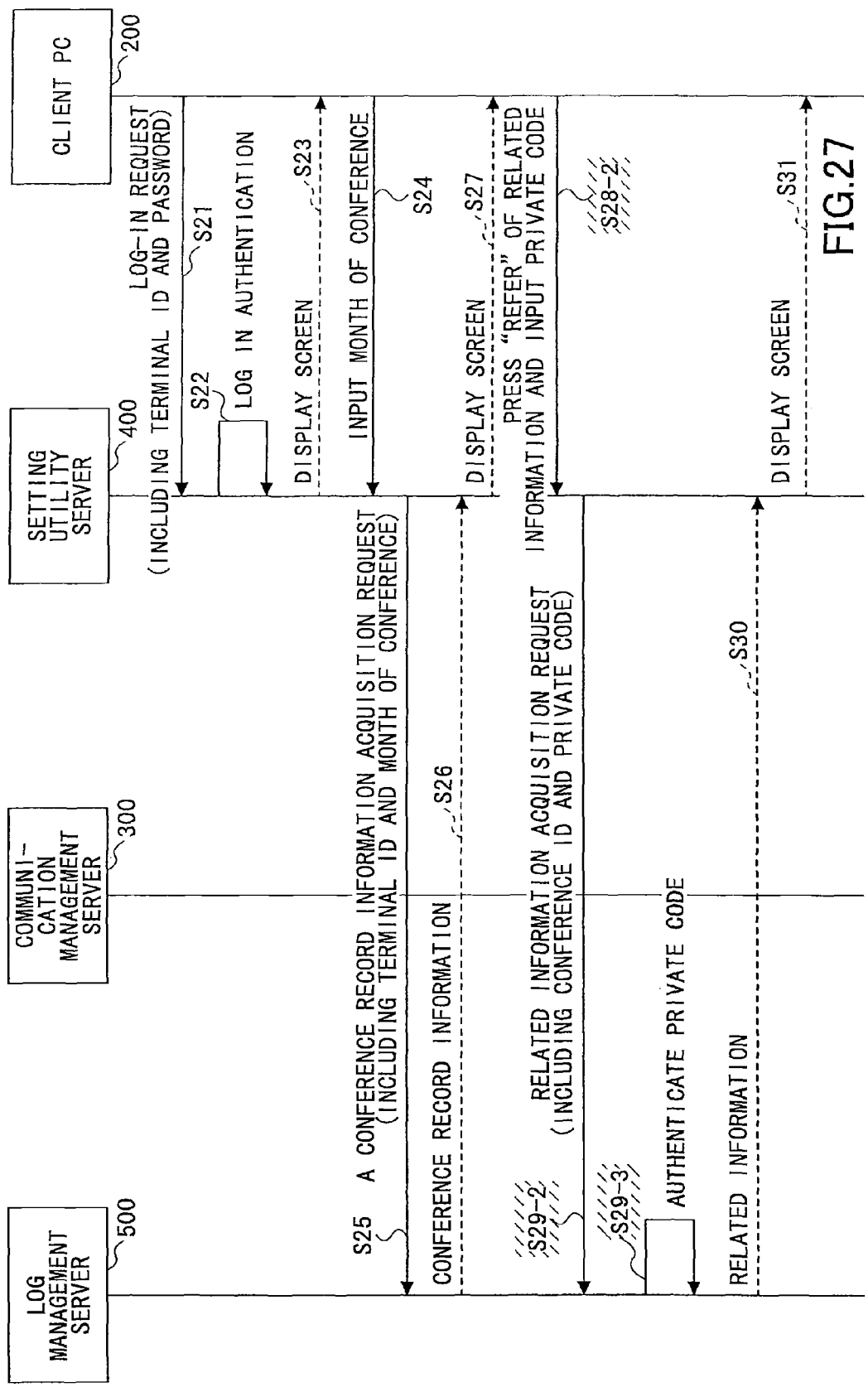
FIG. 27 is a sequence diagram of the browsing process of browsing the related information.

FIG. 27 is a sequence diagram of a browsing process of the related information according to this modified example. The processes in steps S28-2, S29-2, and S29-3 in FIG. 27 differ from those in FIG. 14. In the following, these points are mainly described.

In step S27, when the conference attendance record information acquisition section 404 of the setting utility server 400 receives the conference attendance record information, the screen presentation section 401 causes the client PC 200 to display a list screen (e.g., FIG. 16) by, for example, transmitting the list screen data including the conference attendance record information to the client PC 200.

Figure 28:
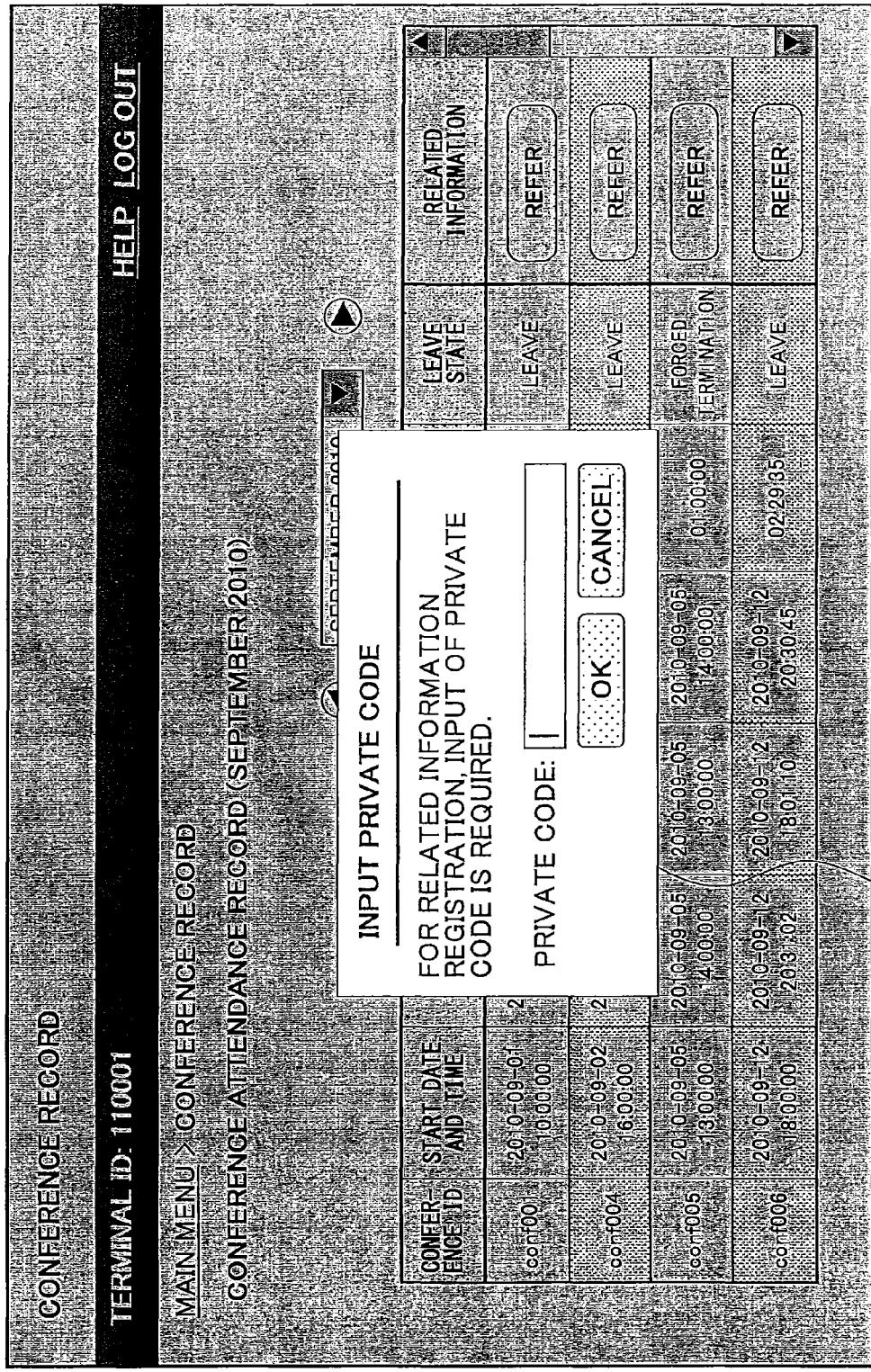
FIG. 28 is an example of the list screen of the conference attendance record.

FIG. 28 illustrates an example of a list screen of the conference attendance record according to this modified example. In response to the receipt of the conference attendance record information, the list screen of the conference record of FIG. 16 is displayed on the client PC 200. Here, when the log-in user presses the "refer" 1504 button in the column of the "related information" of the conference attendance record information list 1503, a Private code input window 2801 as shown in FIG. 28 is displayed. Namely, the input of the Private code is prompted to the log-in user who attempts to browse the related information.

In step S28-2, the client PC 200 inputs the "refer" instruction to refer to the related information to be browsed and the Private code to the setting utility server 400.

In step S29-2, when the "refer" instruction of the related information is input, the related information acquisition section 405 of the setting utility server 400 transmits an acquisition request for acquiring related information of the input conference to the log management server 500. In this case, the related information acquisition section 405 designates the "conference ID" and the input Private code as the parameters of the acquisition request for acquiring related information.

In step S29-3, upon receiving the acquisition request for acquiring related information, the log management section 501 of the log management server 500 checks the Private code first.

Specifically, first, the log management section 501 refers to the scheduled conference management table 503c-2 and acquires the "Private code" corresponding to the "conference ID" acquired in step S29-3. For example, when it is assumed that the "conference ID" is "conf001" by referring to the scheduled conference management table 503c-2 of FIG. 26, the "Private code":"xxxxxxx" corresponding to the "conference ID":"conf001" is acquired. Then, the "Private code" acquired from the scheduled conference management table 503c-2 is compared with the "Private code" input from the client PC 200.

When the Private codes are identical, it is determined that the authentication of the Private code is successful. On the other hand, when the Private codes are not identical, it is determined that the authentication of the Private code has failed.

In step S30, when it is determined that the authentication of the Private code is successful, the log management section 501 of the log management server 500 searches the related information management table 503d of the log management DB 503 by using a parameter. The log management section 501 then transmits the data of the related information corresponding to the "conference ID" (e.g., "conf001") as the search result to the setting utility server 400.

Further, when it is determined that the authentication of the Private code has failed, the log management section 501 does not transmit the data of the related information as the search result and transmits the information indicating that the search cannot be done to the setting utility server 400. When receiving the information indicating that the search cannot be done from the log management server 500, the setting utility server 400 causes the client PC 200 to display a message such as "incorrect Private code, search is not permitted" (step S31).

As described above, according to this modified example, the Private code is used for the control whether the browsing of the related information is to be permitted or not. By doing this, it becomes possible to control so that only the log-in users including the host who know the correct Private codes can browse the related information on the client PC 200.

When the "Private code" acquired from the scheduled conference management table 503c-2 is compared with the "Private code" input from the client PC 200 and it is determined that the Private codes are not identical, the search range may be limited. Specifically, for example, when the authentication of the Private code has failed, the log management section 501 searches the related information management table 503d of the log management DB 503 by using a parameter (step S30). However, the search range may be limited to the related information registered by using the terminal ID (which can be acquired, for example, in step S25) of the log-in user.

For example, in FIG. 17, the "related information" 1705 usually displays all the related information related to the conference registered by all the attendees such as an agenda memo and an attached file. However, when the authentication of the Private code has failed, only the related information registered using the terminal ID (which can be acquired, for example, in step S25) of the log-in user is displayed.

Modified Example 4

In this embodiment, a configuration without the communication management server 300 is described. In this configuration, since there is no communication management server 300, in the registration of the related information, the setting utility server 400 directly registers the related information in the log management server 500.

Registration Process of Related Information

Figure 29:
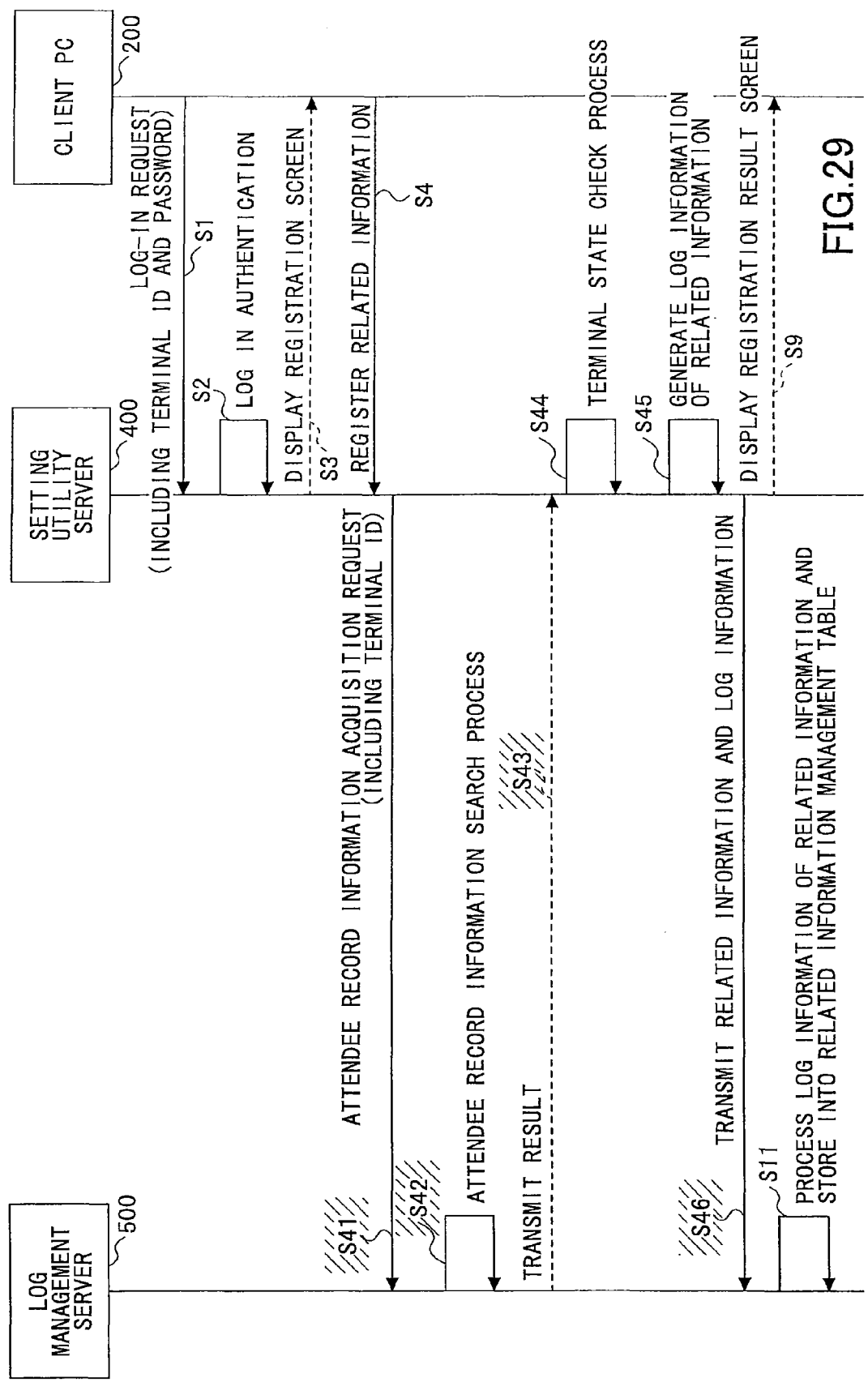
FIG. 29 is a sequence diagram of the registration process of registering the related information.

FIG. 29 is a sequence diagram of a registration process of registering the related information according to this modified example. The configuration of FIG. 29 differs from that of FIG. 11 in that the configuration of FIG. 29 does not include the communication management server 300. Due to the difference, the processes in steps S41 through S46 are different. In the following, these points are mainly described.

In step S4, the client PC 200 transmits the related information to the setting utility server 400. Specifically, when the "transmission" 1204 on the registration screen of FIG. 12 is pressed, the related information is transmitted to the setting utility server 400.

In step S41, the setting utility server 400 (e.g., the related information registration section 403) transmits an acquisition request for acquiring the attendance record information including the terminal ID which is acquired in step S1 to the log management server 500.

In step S42, upon receiving the acquisition request for acquiring the attendance record information, the log management server 500 (e.g., the log management section 501) refers to the attendee record management table 503b and extracts the corresponding records (rows) by using the terminal ID as a search key. Then, the log management server 500 acquires one record (row) which has the latest "join date and time" among the extracted records (rows).

In step S43, the log management server 500 transmits the one record (row) acquired in step S42 to the setting utility server 400.

In step S44, the setting utility server 400 refers to the record acquired from the log management server 500 and checks (determines) whether the "leave state" of the record is "in conference". When the "leave state" of the record is "in conference", the communication terminal 100 identified by the terminal ID is in the "in conference" state.

In step S45, when the state of the communication terminal 100 identified by the terminal ID is "in conference", the setting utility server 400 generates the log information of the related information. Specifically, the setting utility server 400 may generate the log information as shown in FIG. 13 by using the record acquired by the log management server 500 in step S44 and the related information from the client PC 200.

In step S46, the setting utility server 400 transmits the log information of the related information generated in step S45 to the log management server 500.

In step S9, when generating the log information, the setting utility server 400 (e.g., the screen presentation section 401)

causes the client PC 200 to display the registration screen indicating "registration OK". On the other hand, when the "leave state" of the record is not "in conference", the communication terminal 100 identified by the terminal ID is not in the "in conference" state. Therefore, in this case, the setting utility server 400 (e.g., the screen presentation section 401) causes the client PC 200 to display the registration screen indicating "registration NG" by a message such as "this terminal is not in conference, so registration is not permitted".

As described above, according to this embodiment, even when the communication management server 300 is not provided, the setting utility server 400 transmits the related information to the log management server 500 by using the attendance record information in the log management server 500. By doing this, it becomes possible to store the related information (log information) in association with the conference ID of the conference held among the communication terminals 100 into the log management server 500 during the conference with a simpler configuration. Further, by doing this, it also becomes possible to collectively browse all the related information registered by the attendees on a conference based (i.e., on a conference ID basis).

Modified Example 5

Similar to the modified example 4, in this modified example, the modified example 1 (e.g., FIG. 19) is realized with a configuration without the communication management server 300.

Registration Process of Registering Related Information

Figure 30:
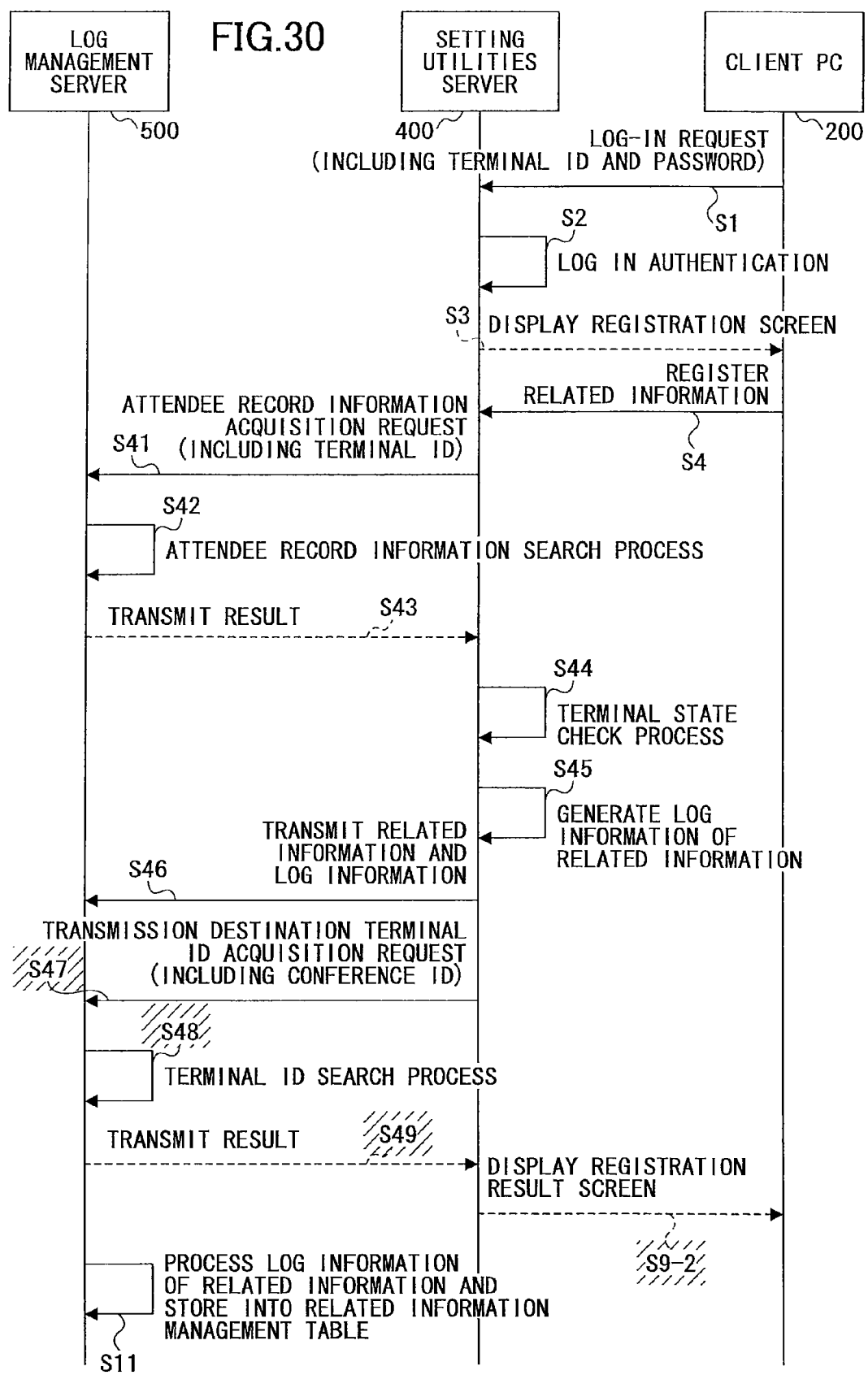
FIG. 30 is a sequence diagram of the registration process of registering the related information.

FIG. 30 is a sequence diagram of a registration process of registering the related information according to an embodiment. The processes to step D46 in FIG. 30 are the same as those in FIG. 29. Processes in step S47 through S49 are added in FIG. 30. Further, a different process in step S9-2 is included in FIG. 30. In the following, these points are mainly described.

In step S47, when the related information is generated, the setting utility server 400 transmits a terminal ID acquisition request for acquiring the "terminal ID" of the transmission destination of the related information to the log management server 500. The terminal ID acquisition request includes the "conference ID" in the record acquired in step S44. Here, the "conference ID" refers to the "conference ID" of the conference which is currently held.

Further, the "terminal ID of the transmission destination of the related information" refers to the "terminal ID" of the communication terminal 100 which attends the same conference as that the communication terminal of the terminal ID acquire in step S1 attends.

As step S48, upon receiving the terminal ID acquisition request, the log management server 500 (e.g., the log management section 501) refers to the related information management table 503d and searches for the "terminal ID" of the communication terminal 100 that currently attends the conference corresponding to the acquired "conference ID".

For example, the log management server 500 (e.g., the log management section 501) refers to the related information management table 503d of FIG. 8, extracts the record where the "leave state" thereof is "in conference", and acquires the "terminal ID" of the corresponding (extracted) record. In the case of FIG. 8, the as the "terminal ID" of the corresponding record, the data "11005" is acquired.

In step S49, the log management server 500 (e.g., the log management section 501) transmits the "terminal ID", which is searched for in step S48 and acquired as the search result (of the "terminal ID of the transmission destination of the related information"), to the setting utility server 400.

In step S9-2, upon receiving the "terminal ID of the transmission destination of the related information", the screen presentation section 401 of the setting utility server 400 causes the client PCs, which are logged in with the received terminal ID, to display the received related information in real time in the "related information" 1705 of the registration screen by, for example, transmitting the registration screen data including the related information.

For example, the screen presentation section 401 of the setting utility server 400 transmits the registration screen data including the related information to not only the client PC 200 which is logged in with the "terminal ID":"ID110001" but also the client PC 200 which is logged in with the "terminal ID":"ID11005". Here, the client PC 200 which is logged in with the "terminal ID":"ID11005" is attending the same conference as the client PC 200 which is logged in with the "terminal ID":"ID11001" does.

By doing this, it becomes possible to cause not only the client PC 200 which is logged in with the "terminal ID": "ID110001" but also the client PC 200 which is logged in with the "terminal ID":"ID11005" to display the received related information in real time (e.g., FIG. 19).

As described above, according to this modified example, without the communication management server 300, it becomes possible to display (browse) the related information in real time which is registered by other attendees other than the log-in user. Accordingly, it becomes possible not only to browse all the related information after the conference but also to display (browse) the related information in real time even during the conference.

Modified Example 6

In the embodiment, the above modified example 3 (e.g., FIG. 25) is realized without the communication management server 300.

In this embodiment, the scheduled conference management table 503c-2 of FIG. 26 is used. In the log management DB 503 of the log management server 500, the data item "Private code" is added in the scheduled conference management table 503c-2. Registration process of registering related information FIG. 31 is a sequence diagram of a registration process of registering related information according to this modified example. The processes of FIG. 31 differ from those in FIG. 11 in the processes of steps S51 through S53. In the following, these points are mainly described.

In step S4-2, the client PC 200 transmits the related information and the Private code to the setting utility server 400.

FIG. 25 illustrates an example of the registration screen of the related information according to this modified example. After inputting texts and an attached file, when the conference attendee (i.e., the log-in user) presses (clicks) the "transmission" 1204, the Private code input window 2501 as shown in FIG. 25 is displayed. In other words, when the related information is to be transmitted, the input of the Private code is prompted to the log-in user who attempts the registration of the related information.

In step S41, the setting utility server 400 (e.g., the related information registration section 403) transmits an attendee record information acquisition request including the "terminal ID" acquired in step S1 to the log management server 500.

In step S42, upon receiving the attendee record information acquisition request, the log management server 500 (e.g., the log management section 501) refers to the attendee record management table 503b and extracts the corresponding records (rows) by using a the terminal ID as a search key. Then, the log management server 500 acquires one record (row) which has the latest "join date and time" among the extracted records (rows).

For example, the log management server 500 (e.g., the log management section 501) first refers to the attendee record management table 503b of FIG. 8. When the search key is "terminal ID":"11001", the log management server 500 acquires one record which has the "terminal ID":"11001" and the latest "join date and time".

In step S43, the log management server 500 transmits the one record (row) acquired in step S42 to the setting utility server 400.

In step S44, the setting utility server 400 refers to the record acquired from the log management server 500 and checks (determines) whether the "leave state" of the record is "in conference" for the log management server 500. When the "leave state" of the record is "in conference", the communication terminal 100 identified by the "terminal ID" is in the "in conference" state.

In step S51, next, when the "leave state" of the record is "in conference", the setting utility server 400 acquires the "conference ID" of the record acquired in step S44, and transmits a Private code check request to the log management server 500. The Private code check request includes the "conference ID" of the record acquired in step S44 and the Private code transmitted in step S4-2.

In step S52, upon receiving the Private code check request, the log management server 500 (e.g., the log management section 501) refers to the scheduled conference management table 503c-2 and extracts the corresponding record (row) by using the "conference ID" as a search key. The record is a conference record of the conference which is currently being held. The log management server 500 then acquires the "Private code" of the extracted record, and compares the "Private code" of the extracted record with the "Private code" input by the client PC 200 (i.e., the "Private code" in the Private code check request).

When those Private codes are identical, the log management server 500 determines that the authentication of the Private code is successful. On the other hand, when those Private codes are not identical, the log management server 500 determines that the authentication of the Private code has failed.

In step S53, log management server 500 (e.g., the log management section 501) transmits the check result whether the authentication of the Private code is successful or has failed to the setting utility server 400.

In step S45, when the state of the communication terminal identified by the "terminal ID" is "in conference" and a response indicating that the authentication of the Private code is successful is received, the setting utility server 400 generates the related information. Specifically, the setting utility server 400 generates the log information of FIG. 13 by using the record acquired from the log management server 500 in step S44 and the related information from the client PC 200.

In step S46, the setting utility server 400 transmits the log information of the related information generated in step S45 to the log management server 500.

In step S9, when the log information is generated, the setting utility server 400 (e.g., the screen presentation section 401) causes the client PC 200 to display the registration screen indicating "registration OK". On the other hand, when the "leave" state of the record is not "in conference" in step S44, the communication terminal 100 identified by the "terminal ID" is not in the "in conference" state.

Therefore, in this case, the setting utility server 400 (e.g., the screen presentation section 401) causes the client PC 200 to display the registration screen indicating "registration NG" with a message such as "this terminal is not attending a conference, so registration is not permitted". Further, when it is determined that the authentication of the Private code has failed in step S53, the setting utility server 400 (e.g., the screen presentation section 401) causes the client PC 200 to display the registration screen indicating "registration NG" with a message such as "incorrect Private code, registration is not permitted".

As described above, according to this modified example, without the communication management server 300 by using the "Private code" for the control of the determination whether the related information is to be registered, it becomes possible to limit to the log-in users knowing the "Private code" including the host who can register the related information with the client PC 200.

Review

As described above, according to an embodiment, by transmitting the related information regarding the conference from the client PC 200 via the communication management server 300, it becomes possible to store the related information (log information) in association with the "conference ID" of the conference which is held with the communication terminals 10 into the log management server 500 during the conference.

Further, by doing this, it becomes possible to browse all the related information registered by the attendees of the conference for each of the conferences (i.e., for each of the "conference IDs") after the conference.

Namely, it becomes possible to easily transmit and browse the related information of the conference held with multiple sites. Especially, even in a complicated conference environment where a plurality of communication terminals 100 join and leave in the middle of the conference in one conference, it becomes possible to easily register and browse the related information registered by each of the attendees.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system, comprising:
    an acquisition unit configured to acquire, from a registration terminal, related electronic information related to a conference session in which a first terminal and a second terminal are currently participating, the registration terminal being different than the first and second terminals; and
    a management unit configured to register, in a memory, communication identification information in association with the acquired related electronic information, the communication identification information identifying the conference session between the first and second terminals, wherein the related electronic information is at least one of a data file and text information related to the conference session.

2. The communication system according to claim 1,
    wherein the acquisition unit is configured to acquire the related electronic information along with terminal identification information identifying one of the first and second terminals from the registration terminal, and
    wherein the management unit is configured to register the terminal identification information and the communication identification information in association with the related electronic information, when the terminal identified by the terminal identification information is currently participating in the conference session.

3. The communication system according to claim 1, wherein the management unit is configured to, upon receiving a request for acquiring related electronic information from a browse terminal, the request including the communication identification information, transmit, to the browse terminal, the related electronic information that is associated with the communication identification information included in the request.

4. The communication system according to claim 1, wherein the management unit is configured to, upon receiving a request for acquiring related electronic information from a browse terminal, the request including the communication identification information, transmit the elated electronic information that is associated with the communication identification information included in the request, to browse terminals of all users who are attending the conference session identified by the communication identification information in the request.

5. The communication system according to claim 4, wherein the management unit is configured to, upon receiving a request for acquiring related electronic information from the browse terminal, the request including the communication identification information and code information, compare the code information with predetermined code information stored in advance, and transmit the terminal identification information and the related electronic information that are associated with the communication identification information included in the request, to the browse terminal, when determining that the code information in the request is not identical to the predetermined code information.

6. The communication system according to claim 1, wherein the acquisition unit is configured to acquire the related electronic information along with code information from the registration terminal, and
wherein the management unit is configured to compare the code information with predetermined code information stored in advance, and associate the terminal identification information and the communication identification information with the related electronic information when determining that the code information in the request is identical to the predetermined code information.

7. The communication system according to claim 6, wherein the acquisition unit is configured to acquire the related electronic information along with the terminal identification information from the registration terminal, and
wherein the management unit is configured to compare terminal identification information identifying a host terminal hosting the conference session with the acquired terminal identification information, and associate the acquired terminal identification information and the communication identification information with the related electronic information, when determining that the terminal identification information identifying the host terminal is identical to the terminal identification information acquired from the registration terminal.

8. The communication system according to claim 1, wherein the management unit is configured to, upon receiving a request for acquiring the electronic information from a browse terminal, the request including the communication identification information and code information, compare the code information with predetermined code information stored in advance, and transmit the related electronic information associated with the communication identification information identical to the communication identification information in the request, when determining that the code information in the request is identical to the predetermined code information.

9. The communication system according to claim 8, wherein the management unit is configured to, upon receiving a request for acquiring the related electronic information from the browse terminal, the request including the communication identification information and the terminal identification information, compare terminal identification information identifying a host terminal hosting the communication with the terminal identification information transmitted from the browse terminal, and transmit the related electronic information in association with the communication identification information identical to the communication identification information in the request, when determining that the terminal identification information identifying the host terminal is identical to the terminal identification information transmitted from the browse terminal.

10. A communication management apparatus, comprising:
an acquisition unit configured to acquire, from a registration terminal, related electronic information related to a conference session in which a first terminal and a second terminal are currently participating, the registration terminal being different than the first and second terminals; and
a management unit configured to register, in a memory, communication identification information in association with the acquired related electronic information, the communication identification information identifying the conference session between the first and second terminals, wherein the related electronic information is at least one of a data file and text information related to the conference session.

11. A non-transitory computer-readable recording medium having stored therein a program that causes a communication management apparatus to execute a method comprising:
acquiring, from a registration terminal, related electronic information related to a conference session in which a first terminal and a second terminal are currently participating, the registration terminal being different than the first and second terminals; and
registering, in a memory, communication identification information in association with the acquired related electronic information, the communication identification information identifying the conference session between the first and second terminals, wherein the related electronic information is at least one of a data file and text information related to the conference session.

12. The communication system of claim 1, wherein the management unit registers the communication identification information, which identifies a video conference session between the first and second terminals.

* * * * *